US007706513B2

(12) United States Patent
Bossemeyer et al.

(10) Patent No.: US 7,706,513 B2
(45) Date of Patent: Apr. 27, 2010

(54) DISTRIBUTED TEXT-TO-SPEECH SYNTHESIS BETWEEN A TELEPHONE NETWORK AND A TELEPHONE SUBSCRIBER UNIT

(75) Inventors: Robert Wesley Bossemeyer, St. Charles, IL (US); Mendel Keith Hamrick, Algonquin, IL (US); Kelly Ann Multach, San Antonio, TX (US); Elizabeth Marie Hart, Lake Zurich, IL (US); Kevin D. Kaschke, Hoffman Estates, IL (US); Mary Louise Hardzinski, Longmont, CO (US); Thomas Joseph McBlain, Arlington Heights, IL (US)

(73) Assignee: AT&T Intellectual Property, I,L.P., Reno, NV (US)

( * ) Notice: Subject to any disclaimer, the term of this patent is extended or adjusted under 35 U.S.C. 154(b) by 1481 days.

(21) Appl. No.: 11/052,526

(22) Filed: Feb. 7, 2005

(65) Prior Publication Data

US 2005/0202814 A1 Sep. 15, 2005

Related U.S. Application Data

(60) Division of application No. 09/518,790, filed on Mar. 3, 2000, now Pat. No. 6,870,914, which is a continuation-in-part of application No. 09/391,425, filed on Sep. 8, 1999, now Pat. No. 6,466,653, which is a continuation-in-part of application No. 09/240,522, filed on Jan. 29, 1999, now Pat. No. 6,400,809.

(51) Int. Cl.

| | |
|---|---|
| ***H04M 1/56*** | (2006.01) |
| ***H04M 1/64*** | (2006.01) |
| ***G10L 13/08*** | (2006.01) |

(52) U.S. Cl. ............................. 379/142.04; 379/88.19; 704/260

(58) Field of Classification Search ............................... 379/142.04–142.06

See application file for complete search history.

(56) References Cited

U.S. PATENT DOCUMENTS

| | | | |
|---|---|---|---|
| 4,894,861 | A | 1/1990 | Fujioka |
| 4,899,358 | A | 2/1990 | Blakley |
| 5,007,076 | A | 4/1991 | Blakley |
| 5,204,905 | A | 4/1993 | Mitome |
| 5,289,530 | A | 2/1994 | Reese |
| 5,384,893 | A | 1/1995 | Hutchins |
| 5,526,406 | A | 6/1996 | Luneau |
| 5,592,585 | A | 1/1997 | Van Coile et al. |
| 5,634,084 | A | 5/1997 | Malsheen et al. |
| 5,646,979 | A | 7/1997 | Knuth |
| 5,729,592 | A | 3/1998 | Frech et al. |

(Continued)

*Primary Examiner*—Quoc D Tran
*Assistant Examiner*—Joseph T Phan
(74) *Attorney, Agent, or Firm*—Cantor Colburn LLP

(57) ABSTRACT

A telecommunications system distributes text-to-speech synthesis between a telephone network and a telephone subscriber unit. The telephone network receives a telephone call from a first telephone subscriber unit over a first communication channel intended for a second telephone subscriber unit, determines that the second telephone subscriber unit subscribes to a speech-based caller identification service provided by the telephone network, converts text information, representing the caller identification of the first telephone subscriber unit into symbols, encodes the symbols to form a data stream, opens a second communication channel between the telephone network and the second telephone subscriber unit, and sends the data stream to the second telephone subscriber unit over the second communication channel.

23 Claims, 16 Drawing Sheets

Processor 704
Caller ID Name-To-Text Preprocessor
(Preprocessor Of The First And Second Embodiments)
Memory Device 703
707 Text 705
Text-To-Symbols Converter
(Third Embodiment) Preferred – 911 Alternate – 911 + 912)
702
701
708 Symbols 706
610
709
Central Telephone Interface Module
Symbol-To-Data Stream Encoder
(Third Embodiment, EG., FSK Encoder)
Data Stream
Data Stream

NETWORK SERVICES NODE 609

U.S. PATENT DOCUMENTS 5,784,448 A * 7/1998 Yaker .................... 379/215.01
5,796,806 A 8/1998 Birckbichler
5,833,942 A 11/1998 Dean et al.
5,848,142 A 12/1998 Yaker
5,850,435 A * 12/1998 Devillier ................ 379/374.02
5,883,942 A 3/1999 Lim et al.
5,903,636 A 5/1999 Malik
5,963,626 A 10/1999 Nabkel
6,028,921 A 2/2000 Malik et al.
6,041,103 A 3/2000 La Porta et al.
6,163,769 A 12/2000 Acero et al.
6,178,232 B1 * 1/2001 Latter et al. .............. 379/88.21
6,219,414 B1 * 4/2001 Maciejewski et al. .. 379/215.01
6,233,325 B1 5/2001 Frech et al.
6,298,122 B1 * 10/2001 Horne ..................... 379/93.09
6,373,925 B1 4/2002 Guercio et al.
6,385,303 B1 5/2002 Peterson et al.
6,400,809 B1 6/2002 Bossemeyer et al.
6,466,653 B1 10/2002 Hamrick et al.
6,498,841 B2 * 12/2002 Bull et al. ............. 379/142.08
6,611,681 B2 8/2003 Henderson
6,718,016 B2 4/2004 Bossemeyer et al.

* cited by examiner

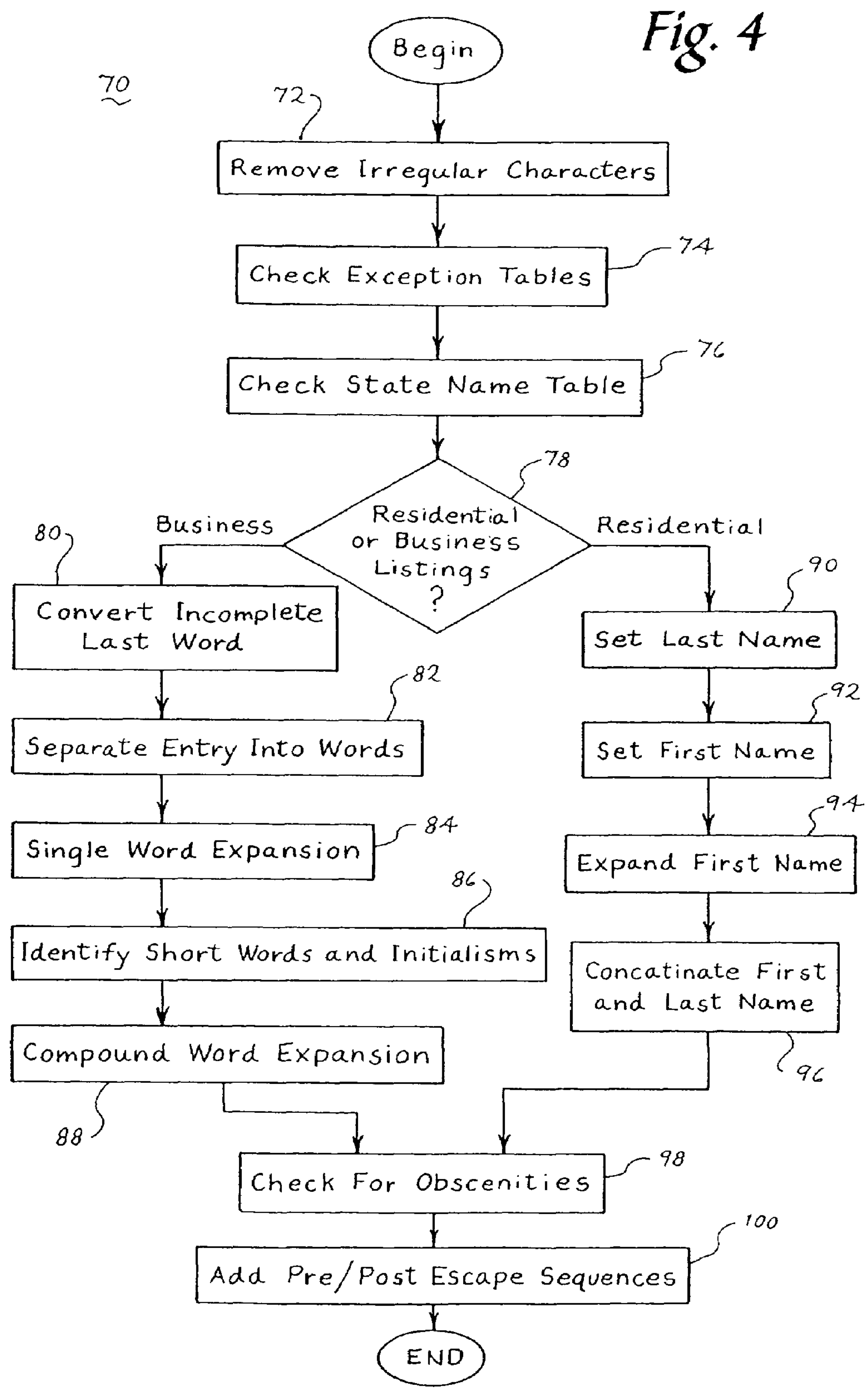
Fig. 4
70
Begin
72
Remove Irregular Characters
Check Exception Tables
74
Check State Name Table
76
78
Residential or Business Listings ?
Business
Residential
80
Convert Incomplete Last Word
82
Separate Entry Into Words
Single Word Expansion
84
86
Identify Short Words and Initialisms
Compound Word Expansion
88
90
Set Last Name
92
Set First Name
94
Expand First Name
Concatinate First and Last Name
96
Check For Obscenities
98
Add Pre/Post Escape Sequences
100
END

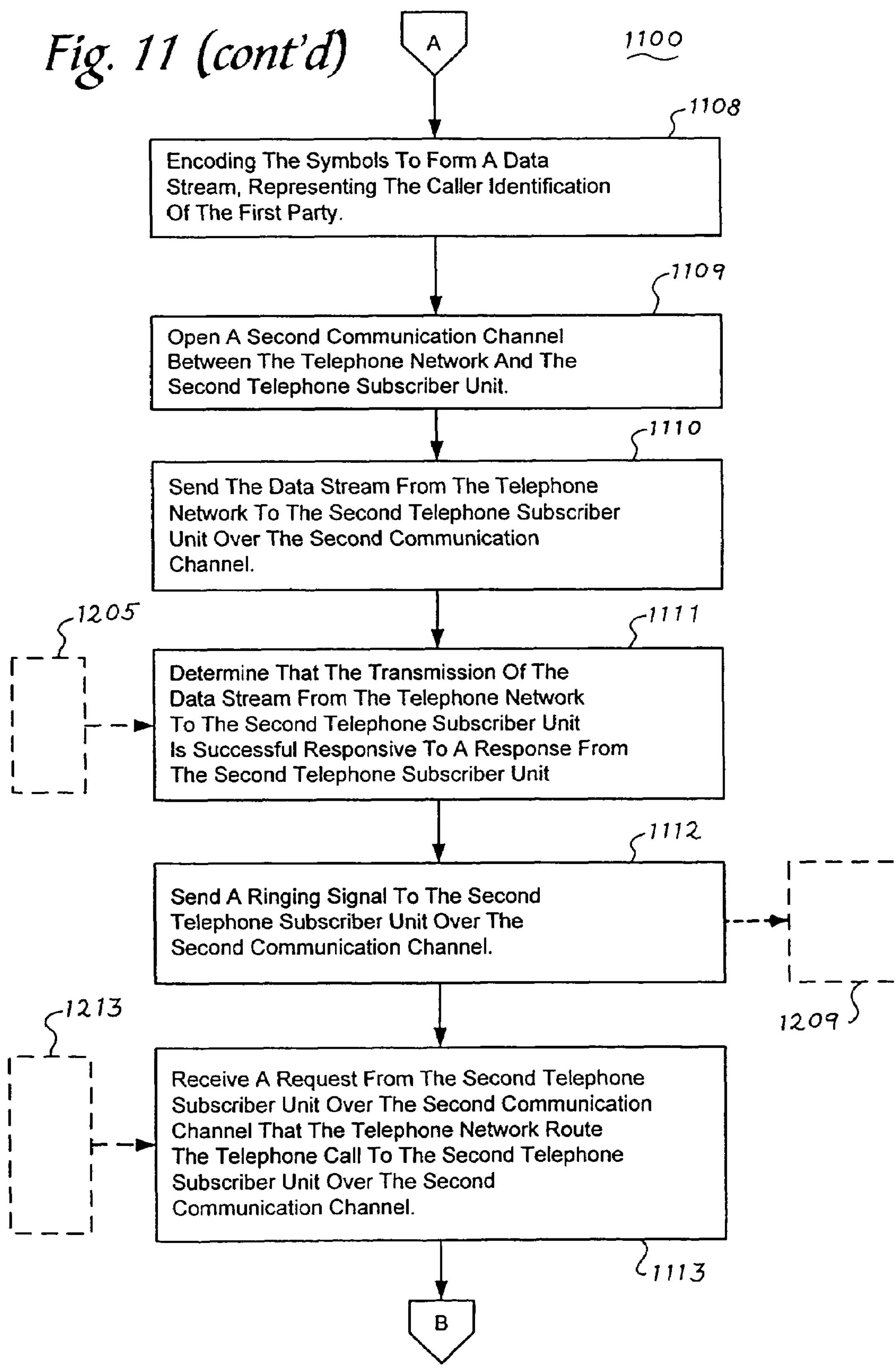
Fig. 11 (cont'd)
A
1100
1108
Encoding The Symbols To Form A Data Stream, Representing The Caller Identification Of The First Party.
1109
Open A Second Communication Channel Between The Telephone Network And The Second Telephone Subscriber Unit.
1110
Send The Data Stream From The Telephone Network To The Second Telephone Subscriber Unit Over The Second Communication Channel.
1205
1111
Determine That The Transmission Of The Data Stream From The Telephone Network To The Second Telephone Subscriber Unit Is Successful Responsive To A Response From The Second Telephone Subscriber Unit
1112
Send A Ringing Signal To The Second Telephone Subscriber Unit Over The Second Communication Channel.
1209
1213
Receive A Request From The Second Telephone Subscriber Unit Over The Second Communication Channel That The Telephone Network Route The Telephone Call To The Second Telephone Subscriber Unit Over The Second Communication Channel.
1113
B

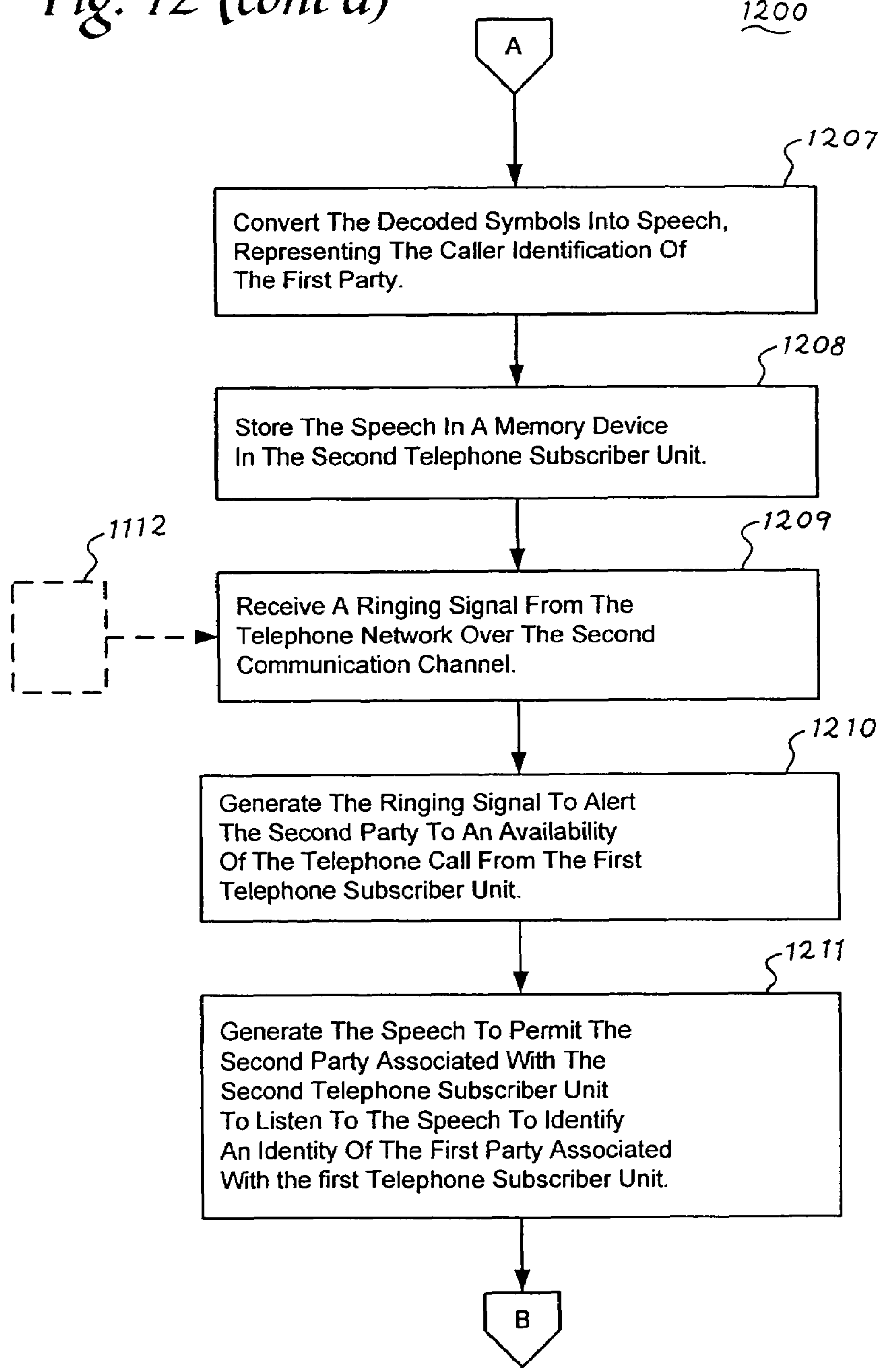
Fig. 12 (cont'd)
1200
A
1207
Convert The Decoded Symbols Into Speech, Representing The Caller Identification Of The First Party.
1208
Store The Speech In A Memory Device In The Second Telephone Subscriber Unit.
1112
1209
Receive A Ringing Signal From The Telephone Network Over The Second Communication Channel.
1210
Generate The Ringing Signal To Alert The Second Party To An Availability Of The Telephone Call From The First Telephone Subscriber Unit.
1211
Generate The Speech To Permit The Second Party Associated With The Second Telephone Subscriber Unit To Listen To The Speech To Identify An Identity Of The First Party Associated With the first Telephone Subscriber Unit.
B

DISTRIBUTED TEXT-TO-SPEECH SYNTHESIS BETWEEN A TELEPHONE NETWORK AND A TELEPHONE SUBSCRIBER UNIT

RELATED APPLICATIONS

The present patent application is a divisional of application Ser. No. 09/518,790, filed Mar. 3, 2000 now U.S. Pat. No. 6,870,914, which is a continuation-in-part of application Ser. No. 09/391,425, filed Sep. 8, 1999, now U.S. Pat. No. 6,466, 653, which is a continuation-in-part of application Ser. No. 09/240,522, filed Jan. 29, 1999, now U.S. Pat. No. 6,400,809, all of which are hereby incorporated by reference.

FIELD OF THE INVENTION

The present invention relates generally to telecommunications, and more particularly to a distributed text-to-speech synthesis between a telephone network and a telephone subscriber unit.

BACKGROUND

Telecommunications systems include a telephone network and telephone subscriber units. The following patents disclose telephone networks or telephone subscriber units that incorporate text-to-speech synthesizers for generating audible caller information from textual data.

U.S. Pat. No. 5,796,806 discloses an advanced intelligent network (AIN) that incorporates text-to-speech technology for presenting spoken caller information to subscribers. In this network, caller ID information, such as the caller's name and number, ordinarily presented visually to a subscriber using a special display device, is synthesized to voice information that is audibly presented to the subscriber. The textual caller information provided to the text-to-speech synthesizer is stored in phonebook-like databases. A problem not addressed by this patent is the format mismatch between the caller information databases and the input strings to the text-to-speech synthesizer. The phonebook like textual databases are not optimized for use as text-to-speech input. Generally, caller information in these databases is abbreviated and truncated into a compact format to reduce storage requirements. Consequently, providing compacted caller information directly to a text-to-speech synthesizer can compromise the quality of the audible output. Hence, in a network there is a need for a spoken caller identification system that improves audible output by accounting for the formatting differences between caller databases and commercially available text-to-speech synthesizers.

U.S. Pat. No. 5,646,979, invented by Kunth, discloses a cordless telephone including a base unit, having a caller identification unit and a speech synthesizer, and a handset, having a speaker. The caller identification unit detects the presence of caller information, including a caller's telephone number, in an incoming telephone call while the telephone is ringing. The speech synthesizer converts the caller's telephone number to a synthesized speech signal and transmits the synthesized speech signal to the speaker. The speaker converts the synthesized speech signal into an audible voice announcement of the calling party's telephone number in real time during the reception of the telephone call. However, this patent does not disclose text to speech conversion of a calling party's name for voice announcement of the calling party's name during the reception of the telephone call. Therefore, if the party, receiving and incoming telephone call and hearing the audible voice announcement of the calling party's telephone number, does not recognize the calling party's telephone number, then the audible voice announcement offers little useful information to the receiving party.

U.S. Pat. No. 5,526,406, invented by Luneau, discloses a calling party announcement apparatus detects an incoming caller line identification (ICLID) number in an incoming telephone call while a telephone is ringing. A database contains names associated with various ICLID numbers or a group of ICLID numbers to be compared to the detected ICLID number. If the ICLID number is not provided by the telephone company, is marked as unlisted, or is from outside the calling area, then an announcement circuit announces "unidentified caller," "private caller," or "out of area," respectively. If the comparison yields no matches, then the announcement circuit announces the detected ICLID number, which is typically the caller's telephone number. If the comparison yields a match, then the announcement circuit announces the name corresponding to the detected ICLID number. The announcement circuit makes the announcement over a telephone receiver after the called party has answered the telephone, but before the telephone company answers the call. Then, the called party can elect to accept or reject the call before the telephone company central office has connected the two parties together. However, this patent does not disclose a calling party's name being sent by the telephone company to be converted into speech during the reception of the telephone call. Therefore, as this patent discloses, if the detected ILCID number does not match one of the ILCID number, having a corresponding name, in the database, then no name is announced. Further, creating the personal database requires a fair amount of work to enter and maintain the numbers and names, which is typically undesirable.

U.S. Pat. No. 4,899,358, invented by Blakley, discloses a telephone network having a call announcement arrangement that obtains a calling party's name from a database search and uses a text-to-speech unit to generate speech signals for transmission to a called communication station. The calling party's name is spoken at the station instead of being displayed. For a conventional analog station, the name is spoken after the called party has answered in response to ringing at the station but before a connection is completed to the caller. The called party accepts the caller either by remaining off-hook or by transmitting a connection signal using, for example, flash or tone signaling. For other illustrative station equipment such as an ISDN speakerphone or a specially adapted analog speakerphone, the calling party name is spoken before the called party answers in place of or in addition to normal ringing. Caller-identifying speech signals are also transmitted to a station determined to be busy to announce the caller name for a call waiting call. However, this patent does not disclose text-to-speech conversion of a calling party's name by equipment associated with the called communication station. Therefore, the called party is dependent upon the telephone network to provide the voice announcement of the calling party's name.

U.S. Pat. No. 5,289,530, invented by Reese, discloses a telephone system for remotely obtaining from a selected local telephone station audible synthesized speech representative of directory telephone numbers and/or names of previous callers stored digitally or alphanumerically in a data memory of a Caller identification (ID) interface unit at the local telephone station. The stored directory telephone numbers and/or names were previously sent to the local telephone station from terminating central office Stored Program Controlled Switching (SPCS) equipment responsive to the telephone line of the local telephone station having Caller ID service and/or other Custom Local Area Signaling System (CLASS) services which discloses a calling party directory telephone number and/or name to a called party. An apparatus, such as a telephone station set or a separate stand-alone unit connected to the telephone station set, and method are also disclosed for recalling the stored directory telephone numbers and/or names from the data memory of the Caller ID interface unit and converting the directory telephone numbers and/or names into a form which can be processed by a speech generator, for receiving the directory telephone numbers and/or names to the speech generator which converts logic signals of the directory telephone numbers and/or names into sounds to audible synthesized speech, and for communicating the audible speech to a calling customer at a remote telephone station, in response to a predetermined command code keyed-in on the remote telephone station keypad by the calling customer. However, this patent does not disclose that the speech processor converts the logic signals of the directory telephone numbers and/or names to audible synthesized speech in real time during the reception of the telephone call for listening to by the called party near the local telephone station. Therefore, the called party can only receive the audible synthesized speech of the directory telephone numbers and/or names from a remote telephone station after the incoming call was been detected and stored.

U.S. Pat. No. 4,894,861, invented by Fujioka, discloses a communication network that sends an originating party's telephone number to a terminal of a terminating party' when setting up an incoming call to the terminal. The terminal detects the originating party's telephone number. The terminal pre-registers a plurality of telephone numbers from whom incoming calls are anticipated and ID information corresponding to each of the telephone number. When the detected party's telephone number matches with one of the registered telephone numbers when the incoming call is generated, a speech generator provides an audible indication of the ID information corresponding to the matched registered telephone number. However, as with U.S. Pat. No. 5,526,406 described hereinabove, this patent does not disclose a calling party's name being sent by the telephone company to be converted into speech during the reception of the telephone call. Therefore, as this patent discloses, if the detected telephone number does not match one of the pre-registered telephone numbers, having corresponding ID information, in the database, then no ID information is announced. Further, creating the personal database requires a fair amount of work to enter and maintain the numbers and names, which is typically undesirable.

U.S. Pat. No. 5,883,942, invented by Lim et al., discloses: "A caller-ID device and/or an integrated caller-ID and answering machine device which is configurable 1) to play a pre-recorded announcement for the user when the caller-ID information received over the PSTN corresponds to stored information indicating an important caller; 2) to play a pre-recorded "block-the-blocker" outgoing message for the caller when a blocked-caller-ID code is received; and/or 3) to play a pre-recorded "reject call" outgoing message for the caller when the caller-ID information corresponds to stored information indicated an undesirable caller. The caller-ID information includes the caller's name, the caller's phone number, and the date of the call and the time of the call. However, this patent does not disclose text to speech conversion of a calling party's name and/or phone number for voice announcement of the calling party's name and/or phone number in real time during the reception of the telephone call. Therefore, the called party must pay special attention to look at the caller-ID information displayed on the caller-ID device to see who is making the incoming call.

Further, a problem not addressed in all of the above patents is the format mismatch between caller ID information displayed on a caller ID subscriber unit and desirable input signals for a text-to-speech synthesizer. The phonebook like textual display of caller ID information is not optimized for use as text-to-speech input. Generally, the caller ID information displayed is abbreviated and truncated into a compact format because to reduce storage requirements in the telephone network and in the caller ID subscriber unit and to reduce the display size in the caller ID subscriber device. Further, sometimes the caller ID information displays a calling party's name adjacent to a calling party's telephone number on a single display line in a compact format. Consequently, providing compacted displayed caller ID information directly to a text-to-speech synthesizer can compromise the quality of the audible output or produce unintended pronunciations.

An advantage to performing the text-to-speech synthesis primarily in the telephone network is that the telephone network is better equipped, in terms of memory and processing power and the like, to perform the complex and computationally intensive calculations associated with text-to-speech synthesis. Hence, in this case, the telephone subscriber units can be made simpler and less expensive. However, when the entire text-to-speech synthesis process occurs in the network, then a voice channel, as opposed to a data channel, typically is opened between the telephone network and the telephone subscriber unit in order to transmit the speech from the telephone network to the telephone subscriber unit. Opening a voice channel presents particular problems when trying to implement particular customer service solutions, such as talking caller identification, for example, when a voice channel is typically not opened until a telephone call is answered by the telephone subscriber unit.

An advantage to performing the text-to-speech synthesis primarily in the telephone subscriber unit is that a voice channel is typically not opened. In this case, the text forming data is sent over a data channel between the telephone network and the telephone subscriber unit. However, when the entire text-to-speech synthesis process occurs in the telephone subscriber unit, the telephone subscriber unit (or an adjunct subscriber device attached to the telephone subscriber unit) performs the complex and computationally intensive calculations associated with text-to-speech synthesis. Hence, the telephone subscriber unit becomes more complex and more expensive.

Accordingly, there is a need for a telecommunications system that performs text-to-speech synthesis in such a manner to obtain the advantage of a simpler and less expensive telephone subscriber unit, associated with performing the text-to-speech synthesis in the telephone network, in combination with the advantage of opening a data channel between the telephone network and the telephone subscriber unit, associated with performing the text-to-speech synthesis in the telephone subscriber unit.

BRIEF DESCRIPTION OF THE DRAWINGS

FIG. 4 illustrates a flowchart diagram describing a method of converting caller information from a compacted data format to an expanded data format suitable for text-to-speech synthesis by the telephone network or the telephone subscriber units shown in FIG. 1 in accordance with either the first or a second embodiment of the present invention.

DETAILED DESCRIPTION OF A PREFERRED EMBODIMENT

Figure 1:
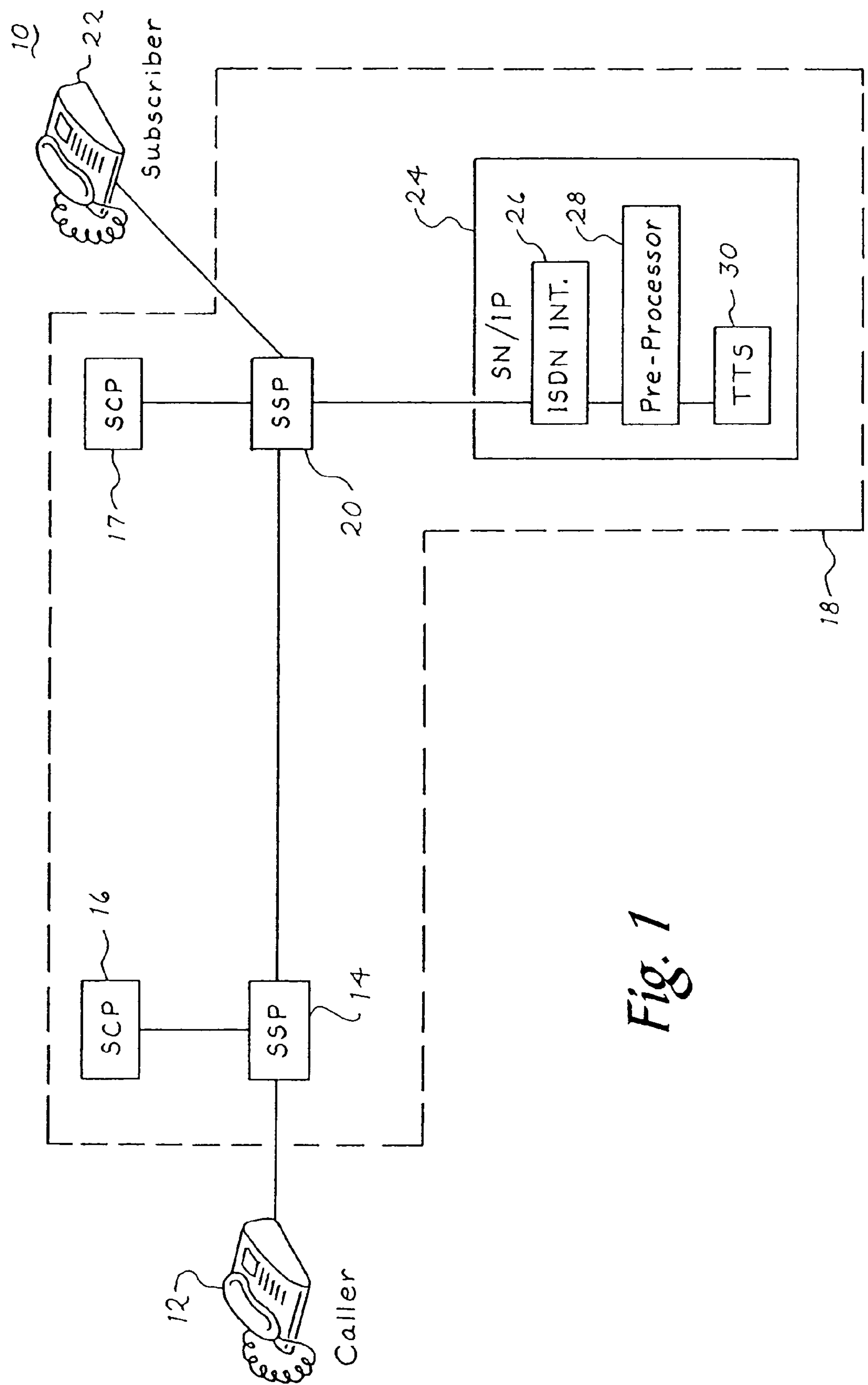
FIG. 1 illustrates a block diagram of a telecommunications system, including a telephone network and telephone subscriber units, in accordance with a first embodiment of the present invention.

As an overview, present application describes three embodiments of the present invention. The first embodiment of the present invention provides a solution to the aforementioned problems in the telephone network. The second embodiment of the present invention provides a solution to the aforementioned problems in the telephone subscriber unit. The third embodiment of the present invention provides a solution to the aforementioned problems partially in the telephone network and partially in the telephone subscriber unit. In the cross-referenced parent patent application having Ser. No. 09/240,522, the first embodiment of the present invention is the preferred solution. In the cross-referenced parent patent application having Ser. No. 09/391,425, the second embodiment of the present invention is the preferred solution. In the present application, the third embodiment of the present invention is the preferred solution.

In accordance with the first embodiment of the present invention, the quality of the audible caller information is enhanced by reformatting textual data from a pre-existing caller database so as to improve the text-to-speech synthesis process. According to one aspect of the first embodiment, a pre-processor converts existing textual caller information from a first predetermined data format stored in a conventional manner to a second data format suitable for text-to-speech synthesis. In addition to improving the quality of the audible output, the pre-processor also permits pre-existing caller information databases, such as a caller ID with name (CNAM) database, to be used with commercially available text-to-speech synthesizers. The pre-processor eliminates the need to create redundant databases of caller information formatted for a particular text-to-speech synthesizer. Another advantage of the first embodiment is that it provides a system and method that permits higher quality audible caller information to be provided to a subscriber during a call-waiting process.

In accordance with the second embodiment of the present invention, the quality of the audible caller information is enhanced by preprocessing caller ID information received as textual data by reformatting the textual data to improve the text-to-speech synthesis process. According to one aspect of the second embodiment, a preprocessor converts received textual caller ID information from a first predetermined data format to a second data format suitable for text-to-speech synthesis. In addition to improving the quality of the audible output, the pre-processor also permits pre-existing caller ID subscriber devices to be used with commercially available text-to-speech synthesizers. The pre-processor eliminates the need to design a particular data interface to transfer caller ID information received in a particular format to a particular text-to-speech synthesizer.

In accordance with the third embodiment of the present invention, the telecommunications system distributes the text-to-speech synthesis between the telephone network and the telephone subscriber unit. The telephone network receives a telephone call from a first telephone subscriber unit over a first communication channel intended for a second telephone subscriber unit, determines that the second telephone subscriber unit subscribes to a speech-based caller identification service provided by the telephone network, converts text information, representing the caller identification of the first telephone subscriber unit into symbols, encodes the symbols to form a data stream, opens a second communication channel between the telephone network and the second telephone subscriber unit, and sends the data stream to the second telephone subscriber unit over the second communication channel. The second telephone subscriber unit detects that the telephone network opened the second communication channel, receives the data stream from the telephone network, decodes the data stream to form decoded symbols, converts the decoded symbols to speech, and generates the speech to permit a second party associated with the second telephone subscriber unit to listen to the speech to identify an identity of a first party associated with the first telephone subscriber unit prior to accepting the telephone call from the first telephone subscriber unit. The symbols may be generated at various points within the distributed text-to-speech synthesizer depending on the requirements and limitations of the telecommunication system.

Referring now to the figures, FIG. 1 illustrates a block diagram of a telecommunications system, including a telephone network 18 and telephone subscriber units 12 and 22, in accordance with the first embodiment of the present invention. The telephone network 18 generally includes remote service switching points (SSP) 14 and 20, remote service control points (SCP) 16 and 17, and a service node/intelligent peripheral (SN/IP) 24. The telephone subscriber units 12 and 22 generally include a caller terminal unit 12 and a subscriber terminal unit 22.

In the first embodiment, the telecommunication system 10 illustrates the system for providing improved audible caller information in an advanced intelligent network (AIN) implementation of a public switch telephone network (PSTN) 18.

The system 10 includes the caller terminal unit 12, such as a telephone or the like, in communication with the remote service switching point (SSP) 14. The remote service control point (SCP) 16 database server provides routing and addressing information to the remote SSP 14. The SCP 16 and SSP 14 communicate using a standard interface protocol, such as signaling system 7 (SS7).

The subscriber terminal unit 22 is coupled to a subscriber SSP 20. A local SCP 17 provides routing and addressing information to the local SSP 20. Communicating with the subscriber SSP 20 is a service node/intelligent peripheral (SN/IP) 24. The functionality of the remote and subscriber SSPs 14, 20 as disclosed herein can be implemented using any AIN compatible switch such as a 5ESS switch, manufactured by Lucent Technologies, Inc.

The SN/IP 24 can be a computer or communication server linked via an open interface to the subscriber SSP 20. In the example shown, the SSP 20 and the SN/IP 24 communicate via an integrated services digital network (ISDN) connection. The ISDN link can be implemented using either ISDN-BRI (Basic Rate Interface) or ISDN-PRI (Primary Rate Interface) protocols, which are known in the art.

The SN/IP 24 can alternatively be connected to another SSP, such as the remote SSP 14, in communication with the subscriber SSP 20.

The SN/IP 24 contains and manages resources required to offer services and service enhancements to network users. Generally, the SN/IP 24 may be used to combine advanced speech technologies and computer telephony integration (CTI) capabilities in a single platform that can be used as a network resource. The services provided by the SN/IP 24 can include speech recognition, voice or fax store and forward, dual-tone multi-frequency (DTMF) recognition with external telephony resources, text-to-speech synthesis, and the like. A compact service node (CSN) as manufactured by Lucent Technologies, Inc., can be used to provide the functionalities of the SN/IP 24 disclosed herein.

The SN/IP 24 includes an ISDN interface 26, a pre-processor 28, and a text-to-speech synthesizer (TTS) 30. The ISDN interface 26 and TTS 30 are customarily available with conventional SN/IPs, such as the Lucent CSN. In the first embodiment of the present invention, the preprocessor 28 can be a software program executed by the SN/IP 24 to convert textual caller information received from the ISDN interface 26. Caller information is received in a first data format and then converted into a second data format, which is then provided to the TTS 30. Using the Lucent CSN, the pre-processor 28 can be implemented using Lucent's Service Logic Language (SLL) and Service Creation Environment (SCE), available with the CSN. In addition, the CSN includes libraries of software functions and drivers that allow the software routines of the pre-processor 28 to readily access SN/IP resources, such as the ISDN interface 26 and TTS 30.

It will be apparent to one of ordinary skill in the art that the pre-processor 28 can be equivalently implemented using only hardware components or any combination of hardware and software components. For example, the pre-processor 28 can be implemented using one or more digital applications specific integrated circuits (ASICs), designed or configured to perform the functions of the pre-processor 28 as disclosed herein.

Figure 2:
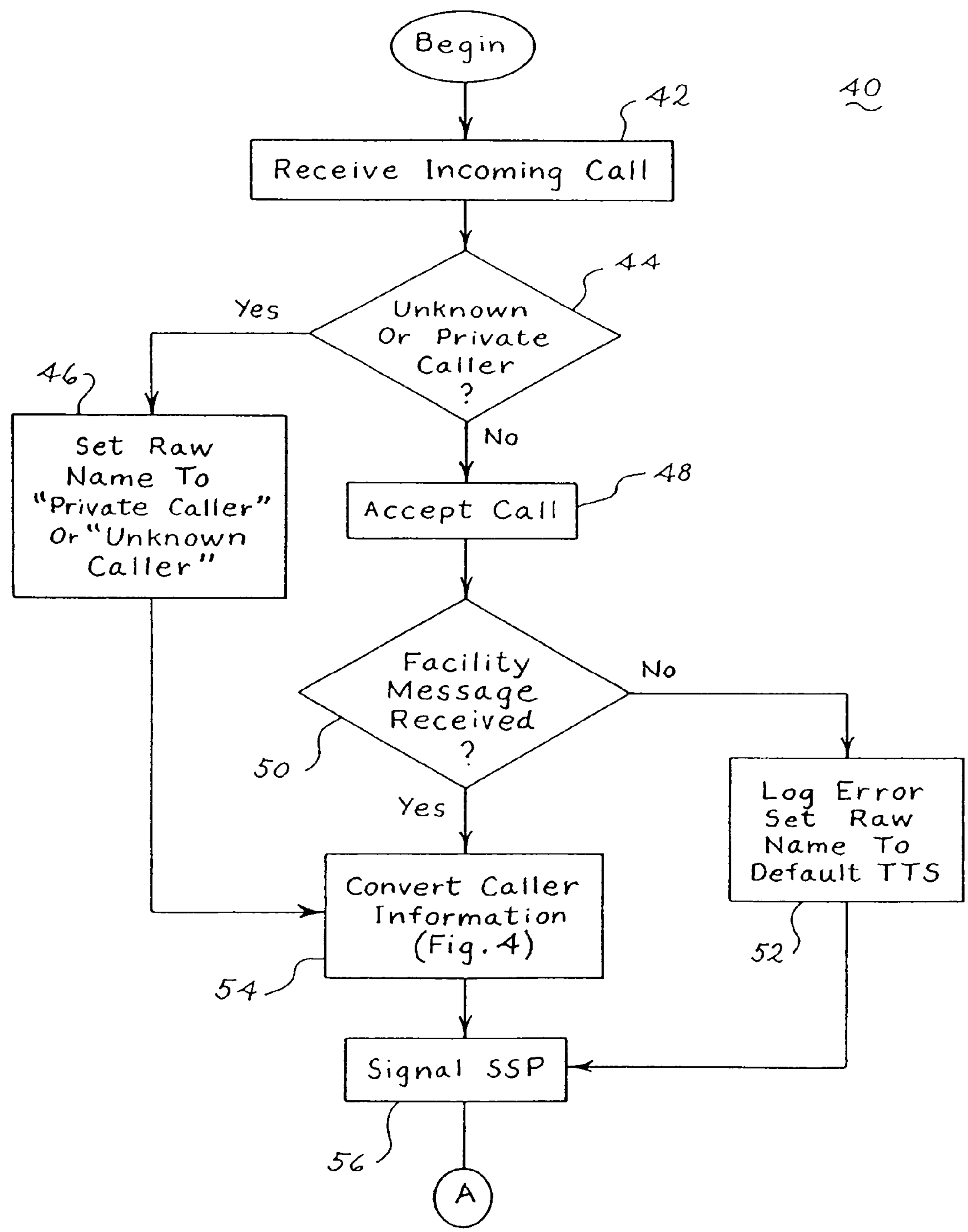
FIGS. 2 and 3 illustrate a flowchart describing a method of operating a service node/intelligent peripheral (SN/IP) in the telephone network shown in FIG. 1 in accordance with the first embodiment of the present invention.
Figure 3:
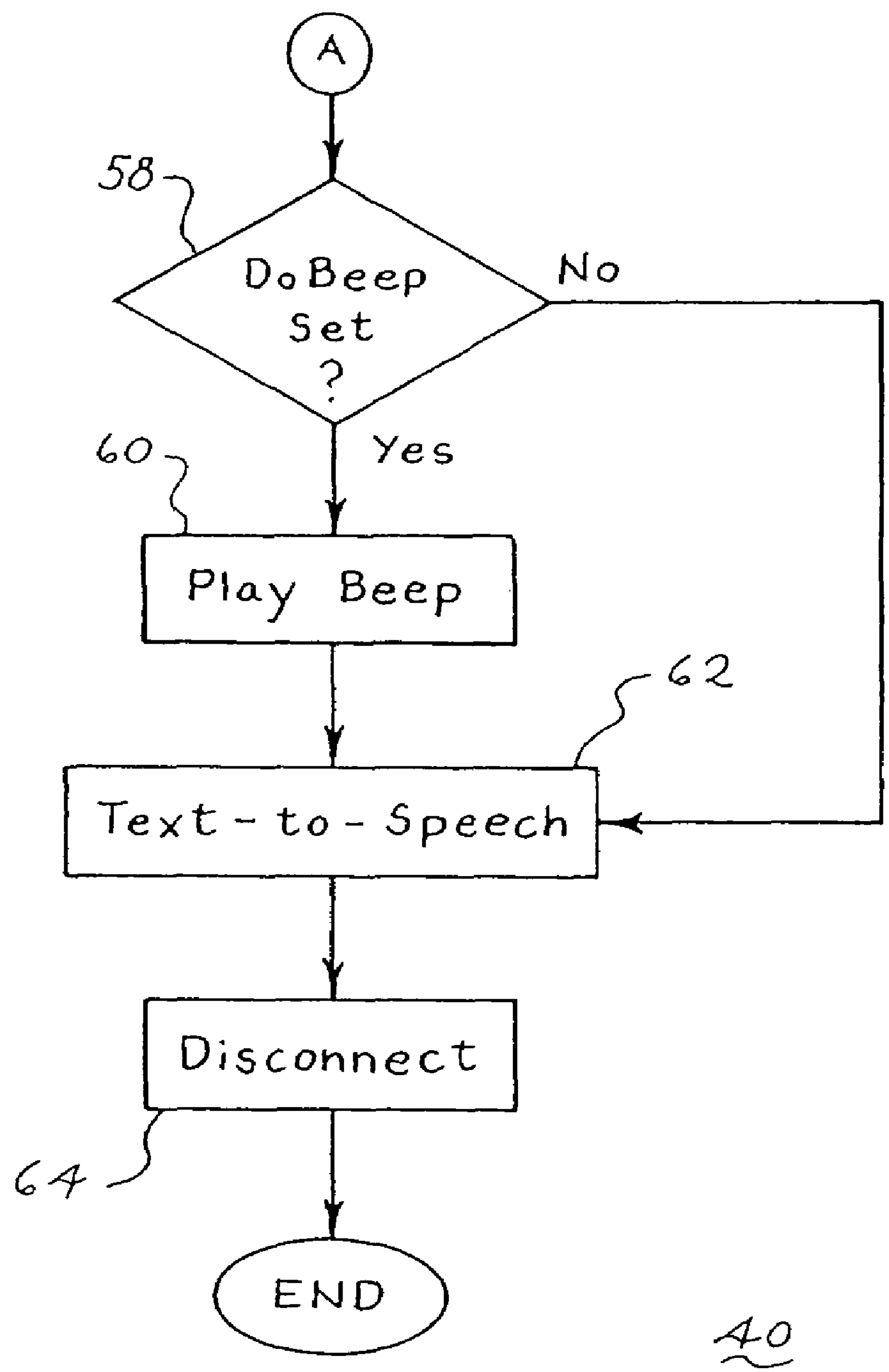

FIGS. 2 and 3 illustrate a flowchart describing a method 40 of operating the service note/intelligent peripheral (SN/IP) 24 in the telephone network shown in FIG. 1 in accordance with the first embodiment of the present invention. The method 40 can be implemented as a software program routine executable by the pre-processor 28.

The method 40 describes a talking call-waiting feature that presents audible caller information in conjunction with or in lieu of a conventional call-waiting "beep." Essentially, the talking call-waiting feature presents the audible caller information to a subscriber when the subscriber, already engaged in a call, receives a second incoming call from a third-party.

Turning now to the method, in step 42 an incoming call is received from the caller 12. Prior to connecting the call to the subscriber unit 22, the subscriber SSP 20 places a virtual call to the SN/IP 24.

Upon receiving the incoming call at the SN/IP 24, the pre-processor 28 checks the calling party ID parameters to determine whether the calling phone number is available or the number is marked "presentation restricted" (step 44). If the number is not available or marked "restricted", the pre-processor sets a software variable "raw name" to indicate an unknown caller or private caller, respectively (step 46). Conversely, if the incoming phone number is available and not restricted, the pre-processor 28 causes the SN/IP 24 to accept the call from the SSP 20 (step 48). In this context, "accepting" a call is an intermediate step before sending answer supervision to the SSP 20. In other words, it is equivalent to allowing ringing.

Next, in step 50, the pre-processor 28 determines whether an ISDN FACILITY message containing the textual caller information has been received from the local SSP 20. Textual caller information can be formatted to any predetermined database standard and typically includes the caller's name and phone number. In the example disclosed herein, the textual caller information received by the pre-processor is provided by a caller-ID with name (CNAM) database resident in the AIN. The format of the CNAM database restricts entries to a maximum of 15 characters, typically all in uppercase. Entries with names longer than 15 characters, particularly business names, are abbreviated and in some cases truncated.

A CNAM database is initially populated manually by an attendant from telephone listing information. Caller information entered into the CNAM database is abbreviated and truncated according to predefined sets of tables and rules.

The CNAM caller information is transferred from the SSP 20 to the SN/IP 24 using an ISDN FACILITY message. If the ISDN FACILITY message is not received within a predetermined time after accepting the call, the SN/IP 24 logs an error and sets the raw name variable to a default TTS value (step 52). However, upon successfully receiving the FACILITY message, the caller information is converted from the CNAM database format to another format suitable for text-to-speech synthesis (step 54). Details of this conversion process are provided by the method 70 shown in FIG. 4.

After conversion of the caller information is complete, the SN/IP 24 generates an answer call event. In this event, a signal is sent from the SN/IP 24 to the SSP 20, causing the SSP 20 to cut-through to the subscriber call in progress (step 56). A conventional SSP, such as the 5ESS switch available from Lucent Technologies, Inc., can provide a call-waiting feature permitting cut-through. After signaling the SSP 20 to cut-through, the SN/IP 24 waits to receive an acknowledgment from the SSP 20 indicating that the SSP 20 has successfully cut-through.

Upon receiving this indication, the SN/IP 24 determines whether to generate a conventional call-waiting "beep" prior to playing the audible caller information (step 58). If a software flag is set indicating that the call-waiting "beep" is to be generated, the SN/IP 24 causes the beep to be generated (step 60). Otherwise, the SN/IP 24 omits the "beep", and immediately performs the text-to-speech conversion generating the audible caller information to the subscriber unit 22 (step 62).

After completing the text-to-speech generation, the SN/IP 24 causes a disconnect signal to be sent to the subscriber SSP 20. This causes the SSP 20 to disengage from the SN/IP 24 service.

In addition to performing the above functions, the SSP 20 is equipped with a watchdog timer (not shown) to ensure that a malfunction in the SN/IP 24 does not indefinitely hang the talking call-waiting service provided to the subscriber unit 22. Watchdog timer functionality is customarily provided with commercially available SSPs, such as Lucent's 5ESS switch.

Figure 5:
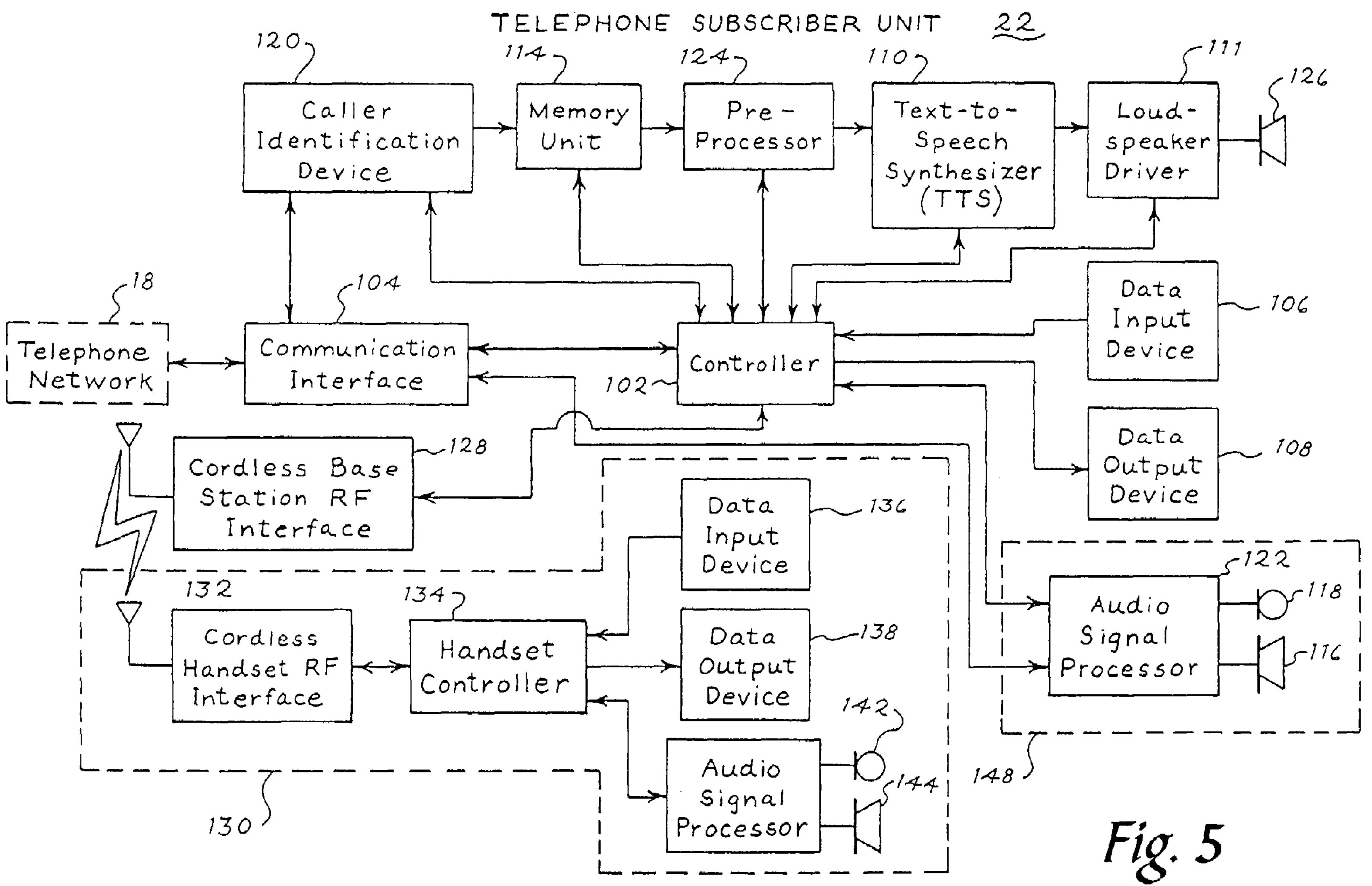
FIG. 5 illustrates a block diagram of a telephone subscriber unit shown in FIG. 1 in accordance with the second embodiment of the present invention.

FIG. 4 illustrates a flowchart diagram describing a method of converting caller information from a compacted data format to an expanded data format suitable for text-to-speech synthesis by the telephone network 18 or the telephone subscriber units 12 and 22 shown in FIG. 1 in accordance with either the first or the second embodiment of the present invention. The method 70 can be embodied in a set of rules stored as a software program in the pre-processor 28 in the SN/IP 24, as shown in FIG. 1, or in the pre-processor 124 in the telephone subscriber unit 22, as shown in FIG. 5. In the first embodiment, the method 40 will be discussed with reference to caller information formatted for storage in a CNAM database in the telephone network 18. In the second embodiment, the method 40 will be discussed with reference to the caller information being received by the telephone subscriber unit 22 from the telephone network 18 in the same format as stored in the CNAM database in the telephone network 18.

In step 72, raw CNAM data representing the caller information, received from the SSP 20 in the first embodiment or received by the telephone subscriber unit 22 in the second embodiment, is first scanned to remove any irregular characters. Throughout this disclosure, the terms "CNAM data" and "CNAM entry" have the same meaning and are used interchangeably. An irregular character is defined as any character other than the following:

A-Z
a-z
0-9
, (comma)
' (apostrophe)
" " (space)

For example, if the CNAM entry comes in as "JOES TAV; RN," it would be converted to "JOES TAVRN".

Next, in step 74, the CNAM, received from the SSP 20 in the first embodiment or received by the telephone subscriber unit 22 in the second embodiment, is compared to an exceptions table that is stored in the SN/IP 24 in the first embodiment or stored the telephone subscriber unit 22 in the second embodiment, respectively. The exceptions table contains a plurality of entries, each corresponding to a caller 10-digit number and its associated CNAM entry. If incoming caller information, i.e., the 10-digit number and CNAM data taken together, corresponds to a table entry, then a predetermined output string will be generated and the remaining steps 76-100 of the conversion method 70 will be skipped. The exceptions table may be used to handle exceptions to normal pronunciations and unusual names. In this manner, surnames such as "Koch" will be correctly pronounced as "Cook" instead of "Kaach". If the incoming caller information does not match an entry in the exceptions table, the method proceeds to step 76.

In step 76, the pre-processor 28 will compare the CNAM data to a state name table. This table is provided so that common CNAM entries can be easily converted. For example, CNAM data does not always represent a caller's name, and instead, will indicate that the incoming call is from a private caller or an out-of-state call, for which there is no name information. Accordingly, the state name table can include entries for incoming CNAM data that indicates a call from any of the fifty states, or US territories, foreign countries, private, unknown, cellular and pay phone calls, or any predetermined text. If a match is found in this table, steps 78-100 are skipped.

The exceptions table and state name table may be implemented as data structures storable within the SN/IP 24 in the first embodiment or in the telephone subscriber unit 22 in the second embodiment. The SN/IP 24 in the first embodiment or in the telephone subscriber unit 22 in the second embodiment can include a software interface that permits these tables to be updated manually by an operator. If the incoming CNAM data does not correspond to an exceptions or state name table entry, the method 70 proceeds to step 78.

In step 78, a check is made to determine whether the CNAM data contains a residential or business listing. Business and residential listings are formatted differently in the CNAM database. Accordingly, separate sets of parsing rules may be provided for business and residential listings.

A comma included in a CNAM entry indicates a residential listing. Thus, in step 78, the pre-processor 28 may scan the characters included in the CNAM entry to determine the presence of a comma. If there is no comma, the CNAM entry may represent a business or entity name, and the method 70 proceeds to the steps 80-88 to convert the CNAM entry to a TTS format. Otherwise, the CNAM entry may represent a residential listing and steps 90-96 are performed to convert the CNAM entry to a TTS format.

In the case of a business listing, the pre-processor 28 in the first embodiment or pre-processor 124 in the telephone subscriber unit 22 in the second embodiment may first determine whether the last word in the CNAM entry is incomplete (step 80). As mentioned above, a CNAM entry contains a maximum of 15 characters. If the entry is 15 characters long, and the last word is one or two characters only, i.e., character 14 is a space and character 15 is a non-space, or character 13 is a space and characters 14 and 15 are non-spaces, then the last word is dropped and is not converted to the TTS format. Thus, it is not spoken to the subscriber. An exception to this rule is if characters 14 and 15 are "TH". If the final word is "THE" or "TH" then the word "THE" is placed at the beginning of the pre-processor output representing the caller information, and the trailing "TH" or "THE" at the end of the CNAM entry is removed.

Next, in step 82, the CNAM is converted into separate words. The maximum number of words in a single CNAM entry is seven. The words are indexed to maintain their order. For example, a CNAM entry "A A A CHGO MTR" would result in the following pre-processor variables being set:

WORD1="A"
WORD2="A"
WORD3="A"
WORD4="CHGO"
WORD5="MTR"

In step 84, individual words included in the CNAM entry are expanded from their abbreviated form. This can be accomplished by comparing each CNAM word to a predetermined business abbreviation table stored within the SN/IP 24. Common words used in business names are abbreviated upon entering them into the CNAM database. The business abbreviation table is a database including entries for each abbreviated word. A CNAM input word included in a business name is compared against this table, and if a match is found, the table entry is substituted for the abbreviated word. Following the above example, a CNAM entry containing the following words may be expanded as:

| CNAM WORD | EXPANDED OUTPUT |
|---|---|
| CHGO | CHICAGO |
| MTR | MOTOR |

After expanding individual words, single letter words are appended with a pause escape character so that the TTS 30 in the first embodiment or that the TTS 110 in the telephone subscriber unit 22 in the second embodiment will properly enunciate the single letter words.

In step 86, short words and acronyms are identified so that they are properly pronounced. An acronym is a “made up word” formed from pronounceable syllables. For example, UNICEF and NASA are two commonly used acronyms. To ensure that CNAM entries representing acronyms or short words are properly pronounced rather than spelled-out, a short word table is provided within the SN/IP 24 in the first embodiment or in the telephone subscriber unit 22 in the second embodiment. The short words table can be a data structure containing entries corresponding to respective two or three letter CNAM input words. If a match is found between a CNAM input and a short word table entry, the CNAM word is reformatted to be pronounced by the TTS as a single word. If the incoming CNAM word is not found in the short word table, the word is modified so that a pause occurs between each letter of the word when it is synthesized by the TTS 30 in the first embodiment or in the TTS 110 in the telephone subscriber unit 22 in the second embodiment.

In step 88, compound CNAM words are expanded. A compound CNAM word includes two or more individual words. For example, the CNAM entry “HOFF EST HS”, the pre-processor would convert this entry to “HOFFMAN ESTATES HIGH SCHOOL.” This compound word expansion can be accomplished using a compound business abbreviation table. Each entry in this table corresponds to a multiple word CNAM expansion. If a match is found, the substituted TTS words are used. Alternatively, compound word expansion can be accomplished using a predetermined set of matching rules and the business abbreviation table. The matching rules compare various combinations of words in the CNAM entry to combinations of entries in the abbreviation table.

Turning now to the residential listings, steps 90-96 illustrate a process of converting residential listings to a format suitable for text-to-speech synthesis. In step 90, the last name of the caller is set to the CNAM sub-string from the beginning of the CNAM entry through to the comma in the CNAM entry. For example, CNAM entry “MC BLAIN, THOMAS” the last name would be set to “MC BLAIN.”

In step 92, the first name of the caller is determined. First, the pre-processor 28 in the first embodiment or the pre-processor 124 in the telephone subscriber unit 22 in the second embodiment determines whether a first name is present by searching for characters to the right of the comma in the CNAM entry. If no characters are present, the first name variable is set to null. If characters are present, the pre-processor 28 in the first embodiment or the pre-processor 124 in the telephone subscriber unit 22 in the second embodiment checks to determine whether the first name is incomplete. If the entry is 15 characters long, and characters 14 and 15 are not spaces, then it is assumed that the first name is incomplete and only the initial of the first name will be enunciated by the TTS 30 in the first embodiment or by the TTS 110 in the telephone subscriber unit 22 in the second embodiment. However, if there are multiple names in the first name field of the CNAM entry, the middle name will be omitted and the full first name will be pronounced. Accordingly, the first name is set to the first character occurring after the comma through the next space.

In step 94, the first name is expanded. A residential abbreviation table is provided within the SN/IP 24 in the first embodiment or in the telephone subscriber unit 22 in the second embodiment. Typically, common first names are abbreviated upon entering them into the CNAM database. The residential abbreviation table includes entries for each abbreviated name. The CNAM input representing a first name is compared against this table, and if a match is found, the table entry is substituted for the abbreviated CNAM input. For example:

| CNAM INPUT | EXPANDED NAME |
|---|---|
| JOS | JOSEPH |

Also in step 94, the pre-processor 28 uses a first names exception table to expand possibly truncated first names. When the CNAM input for a residential listing contains characters in all 15 character positions, it is possible that the first name has been truncated. The pre-processor 28 consults a first name table to determine if the characters in the first name field can be unambiguously resolved. For example:

| CNAM INPUT | EXPANDED NAME |
|---|---|
| HANESSIAN,JOHNA | JOHNATHAN HANESSIAN |

In step 96, the last name and first name are concatenated together, forming a variable representing the complete name.

In step 98, the expanded CNAM entry is checked against an obscenities table to determine whether the expanded name would result in an embarrassing or offensive pronunciation. If a match is found in this table, a default output is generated for that entry such as “Unknown Caller.” In addition, expanded CNAM entry can be checked against a Name Pronunciation Exceptions table. This table includes a list of predetermined names, such as ethnic and non-English names, and their corresponding correct pronunciations, as represented in a TTS compatible format. If an expanded CNAM entry is found in the table, the correct pronunciation is substituted for the expanded name.

In step 100, pre-post escape sequences can be pre-pended and appended to the reformatted caller information. Typically, these escape sequences include symbols causing the TTS 30 in the first embodiment or the TTS 110 in the telephone subscriber unit 22 in the second embodiment to generate silent pauses between initial and last names of residential entries and between single letters in business entries. The pauses are ordinarily on the order of 20 milliseconds.

In summary of the first embodiment of the present invention, the method 70 and the system 10 presents spoken caller information to the telephone subscriber unit 22. The method 70 and the system 10 converts caller information from an abbreviated format to an expanded format more suitable for text-to-speech synthesis to significantly improve the overall quality of the voiced caller information presented to the telephone subscriber unit 22. Moreover, the method 40 and the system 10 permit pre-existing caller-ID databases to be integrated with commercially available text-to-speech synthesizers in a cost-effective manner.

In summary of the second embodiment of the present invention, the method 70 and the telephone service subscriber 22 converts received textual caller ID information to audible caller ID information. The method 70 and the telephone service subscriber 22 convert caller ID information from an abbreviated format to an expanded format for more suitable for text-to-speech synthesis to significantly improve the overall quality of the voiced caller information generated by the telephone service subscriber 22.

FIG. 5 illustrates a block diagram of the telephone subscriber unit 22 shown in FIG. 1 in accordance with the second embodiment of the present invention. The telephone subscriber unit 22 generally includes a controller 102, a communications interface circuit 104, data input device 106, a data output device 108, a text-to-speech signal synthesizer (TTS) 110, a loudspeaker driver 111, a memory unit 114, an earpiece speaker 116, a microphone 118, a caller identification unit 120, an audio signal processor 122, a pre-processor 124, a loudspeaker 126, a cordless base station radio frequency (RF) interface and a cordless handset 130. The cordless handset generally includes a cordless handset RF interface 132, a handset controller 134, a data input device 136, a data output device 138, an audio signal processor 140, a microphone 142, an earpiece speaker 144, and a loudspeaker 146. The controller 102 is coupled to the communications interface circuit 104, the data input keys 106, the display 108, the TTS 110, the memory unit 112, the caller identification unit 120, the audio signal processor 122, the pre-processor 124, the cordless base station RF interface.

In operation, the telephone subscriber unit 22 communicates with the telephone network 18 via the communication interface 104. The telephone subscriber unit 22 preferably receives caller ID information, including the calling party's name and phone number. The controller 102 controls all of the blocks, except for the cordless handset 130, shown in FIG. 5. The caller identification device 120 receives the caller ID information from the communication interface 104, as is well known in the art. At this point, the caller ID information is in the format of data signals represented as a textual format in the data output device 108. The caller information device 120 stores the caller ID information in the memory unit 114. The pre-processor 124 processes the stored caller ID information according to method 70 in FIG. 4 or any other method. The pre-processor 124 converts the stored caller ID information from a first textual data format to a second textual data format suitable for use by the TTS 110. The TTS 110 converts the textual data format in the second format from the pre-processor 124 to an electrical speech signal. The loudspeaker driver 111 amplifies the electrical speech signal to drive the loudspeaker 126. The loudspeaker 126 converts the electrical speech signal into an acoustic signal having an audible level appropriate for listening to by the called party. The data input device 106 permits the called party to input data into the telephone subscriber unit 22 to control the unit 22. The data output device 108 permits the called party to receive data from the telephone subscriber unit 22. The audio circuitry 148 permits the called party to input voice signals via the microphone 118 or listen to acoustic signals via the earpiece speaker 116. Optionally, when the telephone subscriber unit 22 is implemented as a cordless telephone, the controller 102 also controls the cordless base station interface 128 for communicating with the cordless handset.

In the second embodiment of the present invention, the telephone subscriber unit 22 is a cordless telephone and includes all of the blocks listed and shown in FIG. 5. In the cordless telephone, the cordless base station RF interface 128 and the cordless handset RF interface each includes a transmitter, a receiver and a frequency synthesizer (each not shown in either interface) operating at 49 MHz or 900 MHz, as is typical with cordless telephones. With a cordless telephone, the synthesized speech announcing the caller's ID information may be presented to the called party by an electroacoustic transducer provided with either the base station or the cordless handset. Particularly, the electroacoustic transducer includes a loudspeaker provided with the cordless base station unit, a loudspeaker provided with the cordless handset, and an earpiece speaker provided with the cordless handset.

Preferably, when a processor or controller in the cordless base station unit or the cordless handset detects or determines the cordless handset to be proximate to the cordless base station unit, then the synthesized speech is announced using the loudspeaker 126 in the base station to conserve the battery power in the cordless handset 130. The processor causes the loudspeaker provided with the cordless base station unit to generate the acoustic signal responsive to a determination that the cordless handset is proximate to the cordless base station unit. The processor also prevents one of the loudspeaker and the earpiece speaker of the cordless handset from generating the acoustic signal responsive to a determination that the cordless handset is proximate to the cordless base station unit. In this case, the processor determines that the user has the cordless handset 130 nearby the user and near the cordless base station unit, such as in the same room as the cordless base station unit. Hence, the synthesized speech is announced using the loudspeaker provided with the cordless base station unit to provide voiced caller ID information to the user at a site near to the cordless base station unit. This is especially advantageous when the user is not in a call using the cordless handset and receives a voiced caller ID announcement, since the loudspeaker in the cordless handset draws a noticeable amount of current. In the situation when the user is presently engaged in a call using the cordless handset and receives a talking call waiting ID announcement, announcing the talking call waiting ID at the loudspeaker of the cordless base station may be easier for the user to comprehend the announcement rather that having the announcement by the earpiece of the cordless handset. Further, the processor causes one of the loudspeaker and the earpiece speaker of the cordless handset to generate the acoustic signal responsive to a determination that the cordless handset is not proximate to the cordless base station unit. In this case, the processor determines that the user has the cordless handset 130 nearby the user but away from the base station, such as outside a house or in a garage. Hence, the synthesized speech is announced using the loudspeaker 146 or an earpiece speaker in the cordless handset 130 to provide voiced caller ID information to the user at a site remote from the base station. The processor may also cause the loudspeaker provided with the cordless base station unit to generate the acoustic signal responsive to a determination that the cordless handset is not proximate to the cordless base station unit. Since the cordless base station unit typically runs off of AC current, there are no battery power conservation concerns. Moreover, a user may have left the cordless handset at the remote location and moved closer to the cordless base station unit at the time the identity of the calling party is announced. Therefore, in this case, audible announcement at both the cordless base station unit and the cordless handset is desirable.

Such detection may a mechanical interaction between the cordless handset and the cordless base station unit, such as when the cordless handset is placed in a cradle of the cordless base station unit. Alternatively, such detection may be an electrical signal transmission between the cordless handset and the cordless base station unit. The electrical signal transmission may be made between conductive contacts, including battery contacts, when the cordless handset is placed in a cradle of the cordless base station unit or may be made via a radio frequency communication between the cordless handset and the cordless base station unit. The detected proximity between the cordless handset and the cordless base station unit may a fixed distance or a variable distance. Preferably, a manufacturer of the second telephone subscriber unit sets the fixed distance. Preferably, a user of the second telephone subscriber unit sets the variable distance. The typical distance representing the proximity between the cordless handset and the cordless base station unit is preferably in the range of ten to twenty feet. This range depends upon factors, such as the volume level setting of the loudspeaker provided with the cordless base station unit, the hearing quality of the user, the ambient sound level of near the cordless base station unit or the cordless handset, etc., which would affect the likelihood that a person would hear an acoustic signal representing the audible speech generated by the loudspeaker provided with the cordless telephone subscriber unit.

Alternatively, when a processor or controller in the cordless base station unit or the cordless handset detects or determines that the battery power in the cordless handset is too low to provide enough energy to announce the calling party's identification at the cordless handset or detects that the cordless handset is turned off, then the synthesized speech is announced using the loudspeaker 126 in the cordless base station unit.

Preferably, the voiced caller ID information is a name of the calling party and may or may not include the caller's telephone number. The voice announcement of the calling party's name may or may not use the steps of method 70 in FIG. 4, depending on the sophistication, memory size, processing power, etc. of the cordless telephone.

Alternatively, the telephone subscriber unit 22 may be a radio telephone, such as a cellular telephone. The radio telephone includes all of the blocks listed and shown in FIG. 5, except the cordless base station RF interface 128 and the cordless handset 130 which are needed to implement the cordless telephone. The cellular telephone may operate according to any of the several analog or digital signaling standards such as, for example, time division multiple access (TDMA), code division multiple access (CDMA) or Group System Mobile (GSM). Voice announcement of a caller's name in a radio telephone is particularly advantageous today when most public places, such as restaurants and theaters, prohibit radio telephones because of their disturbing ringing sounds. This has caused some radio telephone manufacturers to include vibrating devices to generate a silent vibrating alert upon the detection of an incoming call. However, in a place where people are already speaking, such as in a restaurant, a voice announcement of an incoming call would be much less disturbing and maybe not even noticed by others. To answer the incoming call the called party may have to leave the location so as not to disturb others during an entire phone conversation.

Alternatively, the telephone subscriber unit 22 may be a landline telephone without cordless capabilities. The landline telephone includes all of the blocks listed and shown in FIG. 5, except the cordless base station RF interface 128 and the cordless handset 130 which are needed to implement the cordless telephone.

Alternatively, the telephone subscriber unit 22 may be implemented as an Internet telephone. The landline telephone includes all of the blocks listed and shown in FIG. 5, except the cordless base station RF interface 128 and the cordless handset 130 which are needed to implement the cordless telephone. The Internet telephone is preferably incorporated within a desktop personal computer, but may also be a stand alone unit.

Still alternatively, the telephone subscriber unit 22 may be a caller ID unit having a housing separate from a telephone. The caller ID unit includes all of the blocks listed and shown in FIG. 5, except the cordless base station RF interface 128 and the cordless handset 130, which are needed to implement the cordless telephone, and audio circuitry 148, which is needed for a close coupled handset operation. In this case, the caller ID unit may or may not include its own audio circuitry, such as the loudspeaker driver 111 and the loudspeaker 112, to generate the synthesized audio signals depending on whether the caller ID unit and/or another device, such as the landline telephone, is designed to cooperate with the caller ID device to generate the synthesized audio signals. Preferably, the caller ID unit would include its own audio circuitry and be produced as a separate stand alone unit to be compatible with the many of the conventional landline telephones presently available with subscribing customers. In the caller ID unit, only the communication interface 104, the caller identification device 120, the memory unit 114, the controller 102, the data input device 106 and the data output device 108 are represented by similar blocks having similar functions as is known in Ameritech's 50 memory caller ID with name and number, having model number AM-2000, herein incorporated by reference.

The communications interface circuit 104 communicates voice, data and/or video signals between the telephone subscriber unit 22 and the telephone subscriber unit 12 via the telephone network 18. When the telephone subscriber unit 22 is a landline telephone, a cordless telephone, or a caller ID device, the communications interface circuit 104 typically includes a tip and ring circuit, as is well known in the art. Alternatively, when the telephone subscriber unit 22 is a radio telephone, the communications interface circuit 104 typically includes a radio frequency (RF) transmitter, a RF receiver and a radio frequency synthesizer (each not shown), as is well known in the art. Still alternatively, when the telephone subscriber unit 22 is an internet telephone, the communications interface circuit 104 typically includes an analog modem coupled to a conventional landline telephone line which is in turn coupled to the telephone network 18, a digital subscriber modem coupled to a digital subscriber line which is in turn coupled to the telephone network 18, or a cable subscriber modem coupled to a coaxial cable which is in turn coupled to the telephone network 18.

The data input device 106 and the data input device 136 generate data signals for input to the controller 102 and the controller 134, respectively, responsive to manual actuation thereof by a user of the telephone subscriber unit 22. The data input device 106 generally includes, but is not limited to, a traditional three by four keypad or a touchscreen input device, and smart or control keys. When the telephone subscriber unit 22 is a landline telephone, a radio telephone, or a cordless telephone, the traditional three by four keypad or the touchscreen input device is typically located on a front face of the telephone's housing and the smart or control keys are located on one or both of the front face and a side face of the telephone's housing. Alternatively, when the telephone subscriber unit 22 is a caller ID device, the data input keys 106, representing, for example, "erase" and "review" functions are typically located on a front face of the caller ID device. Still alternatively, when the telephone subscriber unit 22 is an Internet telephone, the data input keys 106 are typically located on a keyboard separate from or integrated with the Internet telephone.

The data output device 108 and the data output device 138 each receive data signals from the controller 102 and the controller 134, respectively, to present visual information for the called party on the data output device 108. Typically the data output device 108 is a display may be implemented with any type of display technology including, but not limited to, liquid crystal displays (LCD), light emitting diode displays (LED), liquid plasma displays (LPD), vacuum florescent displays (VFD) and cathode ray tubes (CRT). When the telephone subscriber unit 22 is a radio telephone, landline telephone, cordless telephone or a caller ID unit, the display 108 is typically located on a front face of the housing. Still alternatively, when the local telephone is an Internet telephone, display 108 is typically a thin film transistor (TFT) LCD or a CRT either separate from or integral to the Internet telephone. Preferably, the display 208 presents caller ID information, such as the caller's name and telephone number. The caller's name and telephone number may be displayed on two separate lines of the display, as known with Ameritech's 50 memory caller ID with name and number, having model number AM-2000.

The pre-processor 124 preferably represents a computer memory having pre-processing software associated therewith. Alternatively, the pre-processor 124 may be implemented fully in hardware, such as a digital signal processor (DSP). The pre-processing software preferably implements, in whole or in any combination, computer code according to the method 70 described in FIG. 4. Alternatively, the pre-processing software may advantageously separate alphabetical characters from numeric characters in a compressed string of alphanumeric characters. In this case, the separation is preferably made based on predetermined field locations allocated for the alphabetical characters and the numeric characters. The separation may also be based on detecting a change in the character string from the alphabetical characters to numeric characters. After pre-processing of this type, the pre-processor may either continue to implement the method 40 of FIG. 4 or transmit the separated data as is to the TSS 110. Therefore, the pre-processor 124 may be of a basic design capable of only converting the format of textual data representing numeric data, such as a telephone number, or a somewhat more advanced design capable of converting the format of textual data representing alphanumeric information, such as a calling party's name and telephone. The level of design of the pre-processor 124 depends upon such engineering tradeoffs such as the power of the processor and the complexity of the pre-processing software.

The text-to-speech synthesizer (TSS) 110 preferably represents a computer memory having text-to-speech software associated therewith. Alternatively, the text-to-speech synthesizer may be implemented fully in hardware, such as a digital signal processor (DSP). The text-to-speech synthesizer 110 may be of a basic design capable of only converting textual data to speech signals representing numeric data, such as a telephone number, or a somewhat more advanced design capable of converting textual data to speech signals representing alphanumeric information, such as a calling party's name and telephone. The level of design of the text-to-speech synthesizer 110 depends upon such engineering tradeoffs such as the power of the processor and the complexity of the text-to-speech software.

The memory unit 114 generally represents a medium for storing data or a text signal. Preferably, the memory unit 114 stores the textual data associated with the caller ID information, such as the caller's name and telephone number. The memory unit 114 also stores the data bases associated with the method 70 discussed in FIG. 4. The memory unit 114 may be implemented with any type of memory technology including, but not limited to, analog and digital memory technology.

The caller identification device 120 generally represents a way for the local party to electronically determine a representation of the identity of the calling party, such as the calling party's name and/or phone number. The identity of the remote party caller may be provided by a telephone network service provider associated with the telephone network 18 and decoded by the caller identification unit 120 or may be determined by the caller identification unit 120 without the assistance of the telephone network service provider. The caller identification unit 120 may be implemented either integral to or separate from a telephone, as is well known in the art.

The controller 102, the loudspeaker driver 111, and the loudspeaker 126 may be implemented, as is well known in the art.

In summary of FIG. 5 for the second embodiment of the present invention, the telephone subscriber unit 22, may take various forms depending on the type of equipment desired by the subscribing customer, the complexity of the engineering design, the sophistication and power of the pre-processor 124 and the TSS 110, etc. A particular advantage of FIG. 5 is that the pre-processing of the textual data from the first data format to the second data format and the text-to-speech conversion occurs in the telephone subscriber unit 22. Therefore, the subscribing customer can purchase equipment similar to the telephone subscriber unit 22 to generate a voice announcement of received caller ID information, without reliance on the telephone network 18 to generate the voice announcement. Hence, while the first embodiment implements a solution in a telephone network, the second embodiment implements a solution in a telephone subscriber unit.

Figure 6:
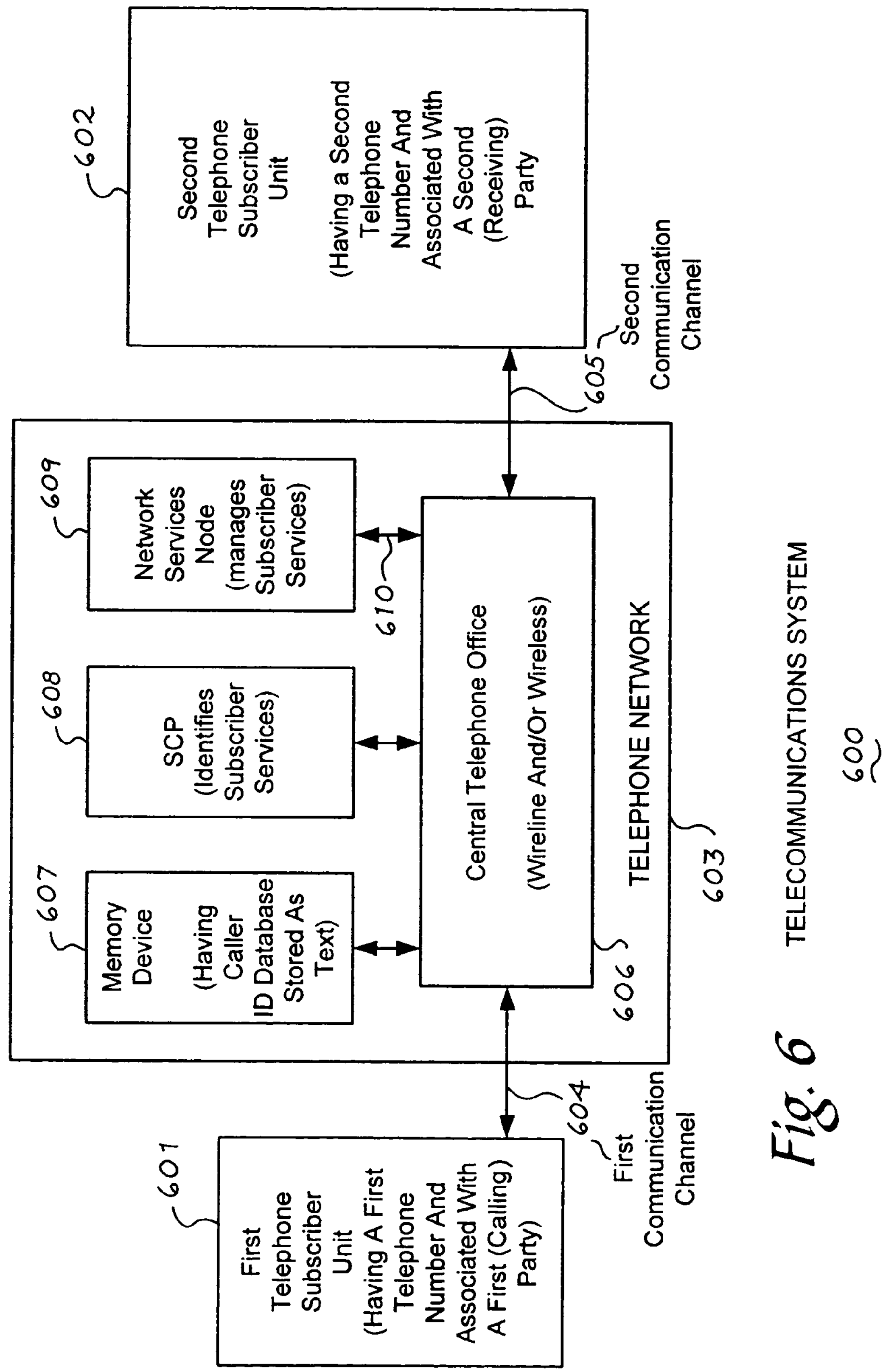
FIG. 6 a block diagram of a telecommunications system, including a telephone network, a first telephone subscriber unit and a second telephone subscriber unit, in accordance with a third embodiment of the present invention.

FIG. 6 a block diagram of a telecommunications system 600, including a first telephone subscriber unit 601, a second telephone subscriber unit 602 and a telephone network 603, in accordance with the third embodiment of the present invention. The telephone network 603 further includes a central telephone office 606, a memory device 607, a service control point (SCP) 608 and a network services node 609.

Each of the first telephone subscriber unit 601 and the second telephone subscriber unit 602 may be a wireless telephone unit, such as a cellular telephone unit, or a wireline telephone unit. Likewise, the telephone network 603 may comprise a wireless telephone network and/or a wireline telephone network.

The first telephone subscriber unit 601 communicates with the telephone network 603 over a first communication channel 604. The telephone network 603 communicates with the second telephone subscriber unit 602 over a second communication channel 605. Each of the first communication channel 604 and the second communication channel 605 may be a wireless telephone unit, such as a radio frequency cellular communication channel, or a wireline telephone unit, such as a twisted pair tip and ring communication channel, depending on the type of telephone subscriber unit and the type of telephone network, as described above.

The first telephone subscriber unit 601 has a first telephone number and is associated with a first party by the telephone network 603. In the third embodiment of the present invention, the first party is identified as the calling party. The second telephone subscriber unit 602 has a second telephone number and is associated with a second party by the telephone network 603. In the third embodiment of the present invention, the second party identified as the receiving party. The association of a telephone number with a particular party by the telephone network 603 is determined by comparing the telephone number identified by the telephone network 603 with records, in a database at the telephone network 603, identifying parties registered to corresponding telephone numbers. In practice, other parties, other than the party registered with the telephone network, may use the first telephone subscriber unit 601 or the second telephone subscriber unit 602, as is well known in the art.

The memory device 607 stores caller identification information in a database as text information. In the third embodiment of the present invention, the database holds phone book information or directory assistance information identifying parties registered with the telephone network.

The SCP identifies services subscribed to by the parties, such as talking caller identification, or talking call waiting, for example. With the talking caller identification service, the receiving party is alerted to an incoming call by audible speech announcing an identity of the calling party, rather than by displayed text information or by a ringing signal, prior to answering the incoming telephone call. With the talking caller waiting service, the receiving party is alerted to an incoming call by audible speech announcing an identity of the calling party, rather than by displayed text information or by an interrupting tone or click signal, during a telephone call with another party.

The network services node 609 generally manages the subscriber services for the telephone network, as identified by the SCP 608. The network services node 609 communicates information, such as a data stream, with the central telephone office 606 over line 610. The network services node 609 is described further with reference to the block diagram illustrated in FIG. 7 and the flowchart diagram illustrated in FIG. 11.

The central telephone office 606 managing communications internal to the telephone network 603 among the memory device 607, the SCP 608 and the network services node 609 in combination with managing communications external to the telephone network 603 between the first telephone subscriber unit 601 and the second telephone subscriber unit 602. Communications among the network services node 609, the first telephone subscriber unit 601 and the second telephone subscriber unit 602 are described further with reference to the flowchart diagrams illustrated in FIGS. 10, 11 and 12.

Please note that the design of the telephone network 603 is not limited to the particular block diagram of the telephone network 603 illustrated in FIG. 6. The various blocks in the telephone network 603 illustrated in FIG. 6 generally represent functions of the telephone network 603, by example only. In practice, the various blocks in the telephone network 603 illustrated in FIG. 6 may also be combined or connected in various other ways depending on various design tradeoffs and requirements of the telephone network 603.

Also note that any of the various functions performed in each of the first telephone subscriber unit 601, the telephone network 603 and the second telephone subscriber unit 602 may be performed by a computer-readable data storage medium. Such medium include, without limitation, a read only memory (ROM), a random access memory (RAM), a floppy disk, a CD-ROM disk, a hard drive, a DVD disk, and the like. Preferably, the medium is embodied within or coupled to an integrated circuit.

Figure 7:
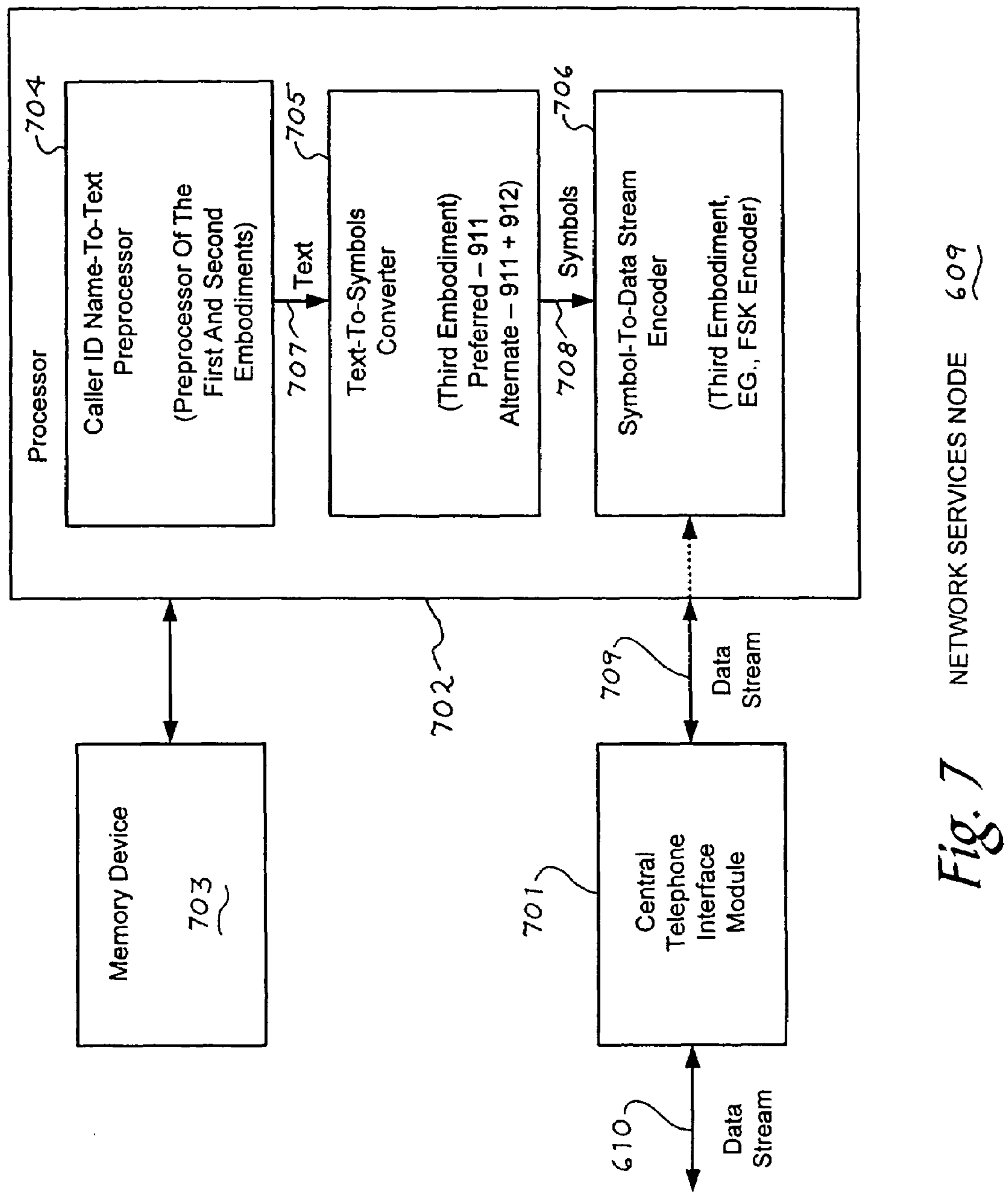
FIG. 7 illustrates a block diagram of a network services node as part of the telephone network shown in FIG. 6, in accordance with the third embodiment of the present invention.

FIG. 7 illustrates a block diagram of a network services node 609 as part of the telephone network 603 shown in FIG. 6 in accordance with the third embodiment of the present invention. The network services node 609 generally includes a central telephone interface module 701, a memory device 703 and a processor 702. The processor 702 generally includes a caller identification-to-text preprocessor 704, a text-to-symbol converter 705 and a symbol-to-data stream encoder 706, as well as other functions, such as those described in the flowchart diagram illustrated in FIG. 11. The processor 702 is coupled to the central telephone interface module 701 and the memory device 703 and implements the flowchart diagram illustrated in FIG. 11.

The caller identification-to-text preprocessor 704 generally represents the preprocessor described in the first and the second embodiments of the present invention. Any feature of the first or the second embodiments of the present invention may be combined with any feature of the third embodiment of the present invention to produce a design with the most advantageous features or method of operation. The caller identification-to-text processor 704 processes the caller identification information stored in the database of the memory device 607 to form text information 707. The text information 707 still represents the caller identification information.

The text-to-symbol converter 705 receives the text information 707 and converts the text information 707 into symbols 708. The symbols 708 still represent the caller identification information. The symbols are further described with reference to FIG. 9. The text-to-symbol converter 705 represents an advantageous feature of the third embodiment of the present invention. The method of converting text information into symbols is a computationally intensive task that is most advantageously performed in the telephone network 603, thereby resulting in a simpler and less expensive second telephone subscriber unit.

The symbol-to-data stream encoder 706 receives the symbols 708 and encodes the symbols 708 into a data stream 706. The data stream 706 still represents the caller identification information. In the third embodiment of the present invention, the preferred method of encoding is frequency shift keying (FSK) encoding. Alternatively, other methods of encoding may be employed, depending on the nature of the symbols, as is well known in the art. Once the data stream is formed, the data stream is in a format ready to be transmitted to the central telephone office 606 in the telephone network 603.

The central telephone interface module 701 sends the data stream 709, formed by the symbol-to-data stream encoder 706, to the central telephone office 606 over line 610.

The memory device 703 stores caller identification information retrieved from the database.

Please note that the design of the network services node 609 is not limited to the particular block diagram of the network services node 609 illustrated in FIG. 7. The various blocks in the network services node 609 illustrated in FIG. 7 generally represent functions of the network services node 609, by example only. In practice, the various blocks in the network services node 609 illustrated in FIG. 7 may also be combined or connected in various other ways depending on various design tradeoffs and requirements of the network services node 609.

Figure 8:
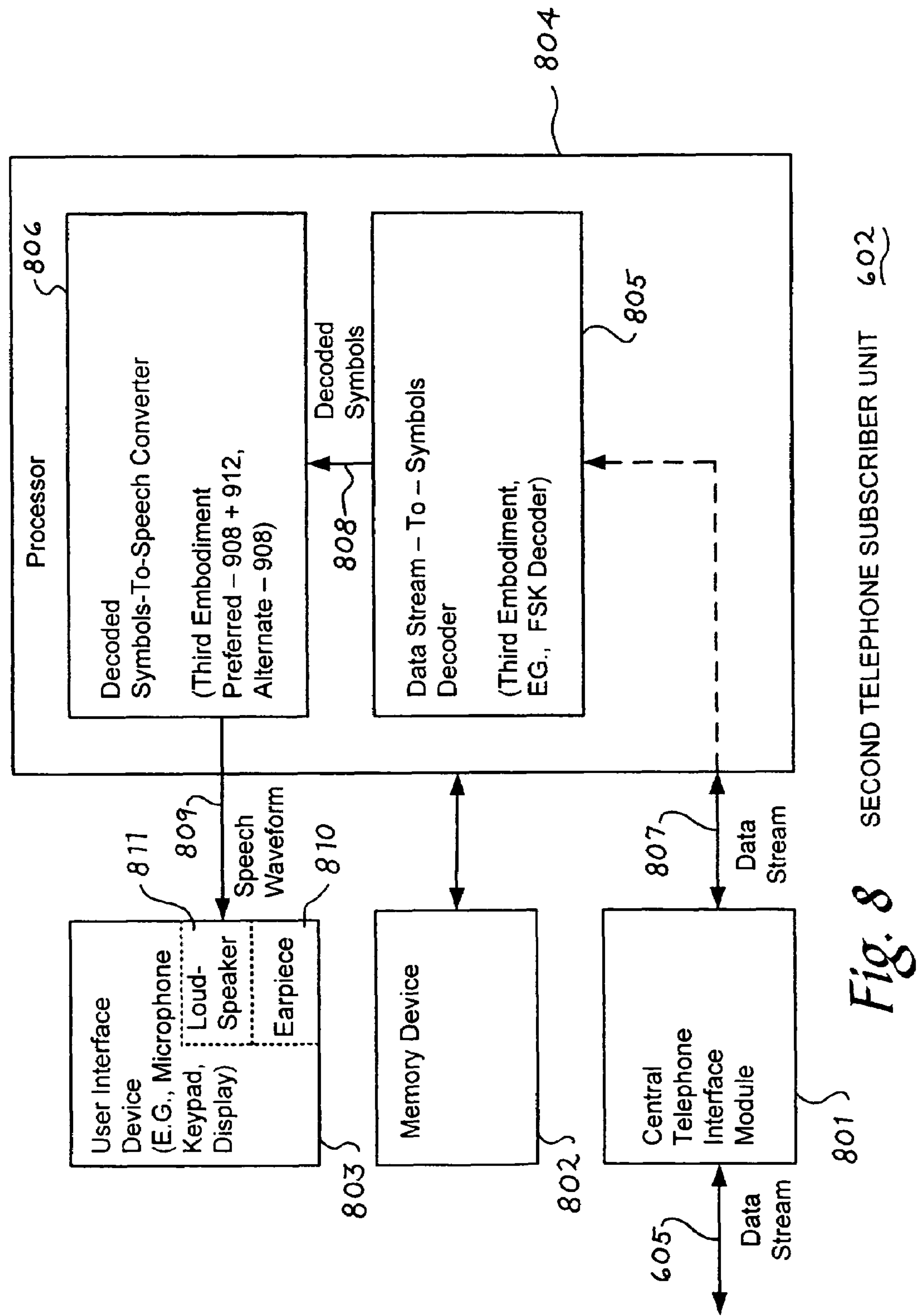
FIG. 8 illustrates a block diagram of the second telephone subscriber unit shown in FIG. 6, in accordance with the third embodiment of the present invention.

FIG. 8 illustrates a block diagram of the second telephone subscriber unit 602 shown in FIG. 6 in accordance with the third embodiment of the present invention. The second telephone subscriber unit 602 generally includes a central telephone interface module 801, a memory device 802, a user interface device 803 and a processor 804. The processor 804 generally includes a data stream-to-symbols decoder 805 and a decoded symbols-to-speech converter 806, as well as other functions, such as those implemented in the flowchart diagram 1200 of FIG. 12. The processor 804 implements method illustrated in FIG. 12. The second telephone subscriber unit 602 may be implemented as a single integrated device or as a telephone device carried by one housing and coupled to an adjunct device carried by another housing.

The central telephone interface module 801 receives the data stream, representing the caller identification information, over the second communication channel 605 and forwards the data stream to the data stream-to-symbol decoder 805 on line 807. The central telephone interface module 801 may be a wireless telephone interface or a wireline interface. In the case of the wireless telephone interface, the interface is preferably a radio frequency (RF) telephone interface comprising a RF transmitter, a RF receiver and a RF antenna, and, alternatively, an infrared frequency telephone interface comprising a transmitter, a receiver and an infrared signaling device, wherein each wireless telephone interface is well known in the art. In the case of a wireline telephone interface, the interface is preferably a tip and ring interface for a twisted pair wired signaling path.

The data stream-to-symbols decoder 805 receives the data stream at line 807 and decodes the data stream to produce decoded symbols at line 808. The data stream at line 807 and the decoded symbols at line 808 still represent the caller identification information. In essence, the data stream-to-symbols decoder 805 performs an inverse function of the symbol-to-data stream encoder 706 performed by the telephone network 603 to recover the encoded symbols sent by the telephone network 603. In the third embodiment of the present invention, the preferred method of decoding is frequency shift keying (FSK) decoding to match the preferred method of encoding described with the symbol-to-data stream encoder 706 performed by the telephone network 603. Alternatively, other methods of decoding may be employed, depending on the nature of the encoded symbols, as is well known in the art.

The decoded symbols-to-speech converter 806 receives the decoded symbols at line 808 and decodes the symbols to produce a speech waveform at line 809. The decoded symbols at line 808 and the speech waveform at line 809 still represent the caller identification information. The decoded symbols are further described with reference to FIG. 9. The decoded symbols-to-speech converter 806 represents an advantageous feature of the third embodiment of the present invention. The method of converting the decoded symbols into a speech waveform is a less computationally intensive task which is most advantageously performed in the second telephone subscriber unit 602, thereby resulting in a simpler and less expensive second telephone subscriber unit 602. Hence, a combination of the text-to-symbol converter 705 in the telephone network 603 with the decoded symbols-to-speech converter 806 in the second telephone subscriber unit 602 produces a beneficial and balanced design. In essence, the telephone network 603 performs the most difficult task that requires more processing power and less memory, and the second telephone subscriber unit 602 performs the least difficult task that requires less processing power and less memory. Moreover, since the symbols are encoded into a data stream for transmission from the telephone network 603 to the second telephone subscriber device 602 over the second communication channel 605, then the data stream is sent over a data channel, as opposed to a voice channel.

In a talking caller identification application, not opening a voice channel is advantageous because it is preferred that the second telephone subscriber device 602 stay "on hook" for a variety of reasons, including increased privacy for the second party, less expense for the telephone network operator or the second party, and efficient utilization of a voice channel resource, to name a few. By sending the encoded symbols as a data stream over a data channel, the second telephone subscriber device 602 is permitted to stay "on hook" while the second telephone subscriber device 602 receives the data stream representing the caller identification information.

In a talking call waiting application, the telephone network 603 sends the encoded symbols as a data stream, representing the caller identification information, on a data channel while the second party is currently engaged in a telephone call with another party on a voice channel. Note that both the data channel and the voice channel are opened at the same time on the second communication path 605. Preferably, the data stream is sent over the data channel as sub-audible data so that neither the second party nor the other party on the voice channel hears the information represented by the data stream. Hence, sending data stream, representing the caller identification information associated with the first party, over the data channel advantageously routes the caller identification information to an earpiece or a loudspeaker of the second telephone subscriber unit 602 without disturbing the voice channel. Of course, the sub-audible data stream is converted to a speech waveform prior to being presented to the earpiece or the loudspeaker for audible speech recognition by the second party.

The memory device 802 stores one of the data stream at line 807, the decoded symbols at line 808 and the speech waveform at line 809 for later reproduction of the speech-based caller identification of the first party responsive to a command by the second party. Alternatively, the speech generated by the second telephone subscriber unit 602 is repeatedly retrieved from the memory device 802 while alerting the second party. In this case, the second telephone subscriber unit 602 repeats the speech without the telephone network 603 repeatedly sending data representing the speech.

The user interface device 803 generally includes such items as a microphone, a keypad, a display, a loudspeaker 811 and an earpiece 810. The loudspeaker 811 and the earpiece 810 are generally known as electroacoustic transducers, as is well known in the art. The loudspeaker 811 and/or the earpiece 810 generate audible speech responsive to receiving the speech waveform at line 809.

Figure 9:
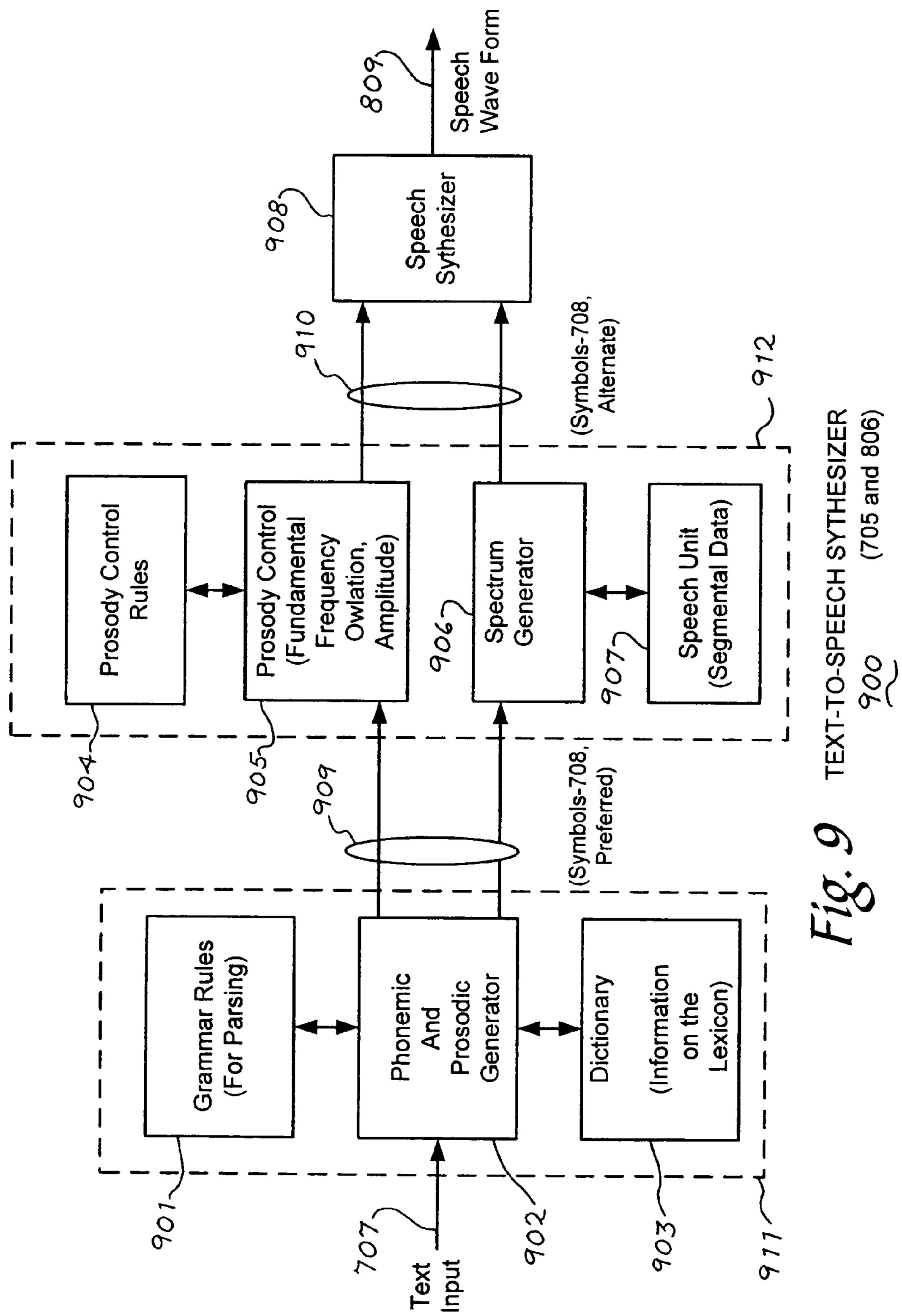
FIG. 9 illustrates a block diagram of a text-to-speech synthesizer partially shown in FIG. 7 and partially shown in FIG. 8, in accordance with the third embodiment of the present invention.

FIG. 9 illustrates a block diagram of a text-to-speech synthesizer 900 partially implemented in the network services node illustrated in FIG. 7 and partially implemented in the second telephone subscriber unit 602 illustrated in FIG. 8, in accordance with the third embodiment of the present invention. The text-to-speech synthesizer 900 generally includes a phonemic and prosodic information generator 902, grammar rules 901, a dictionary 903, a spectrum generator 906, a prosody controller 905, prosody control rules 904, a speech unit with segmental data 907 and a speech synthesizer 908. The text-to-speech synthesizer 900 generally receives the text information at line 707, illustrated in FIG. 7, and generates the speech waveform at line 809, illustrated in FIG. 8. The individual blocks and interconnections of the text-to-speech synthesizer 900, as a whole, are well known in the art and is disclosed in a publication entitled "Survey of the State of the Art in Human Language Technology", 1996, located at a web site http://cslu.cse.ogi.edu/HLTsurvey/HLTsurvey.html, having editorial board: Ronald A. Cole, Editor in Chief, Joseph Mariani, Hans Uszkoreit, Annie Zaenen, Victor Zue, having managing editors: Giovanni Battista Varile, Antonio Zampolli, having sponsors: National Science Foundation and the European Commission, wherein additional support was provided by: Center for Spoken Language Understanding, Oregon Graduate Institute, USA, and University of Pisa, Italy. This publication is hereby incorporated into the present application by reference.

In the third embodiment of the present invention, the symbols, generated by the text-to-symbols converter 705 in the network services node 702, preferably comprise phonemic and prosodic information generated in the text-to-speech synthesizer 900 at line 909. In this case, text-to-symbols converter 705 in the network services node 702 is implemented using the three blocks identified by reference number 911 in FIG. 9. Then, it follows that the decoded symbols-to-speech converter 806 in FIG. 8 is implemented using the four blocks identified by reference number 912 in combination with the speech synthesizer 908 in FIG. 9. An advantage of this type of distributive arrangement is that the bandwidth of the second communication channel needed to send the symbols is less than the bandwidth needed for the following alternative.

Alternatively, the symbols, generated by the text-to-symbols converter 705 in the network services node 702, comprise spectral and prosodic feature parameters generated in the text-to-speech synthesizer 900 at line 910. In this case, text-to-symbols converter 705 in the network services node 702 is implemented using the seven blocks identified by reference numbers 911 and 912 in FIG. 9. Then, it follows that the decoded symbols-to-speech converter 806 in FIG. 8 is implemented using the speech synthesizer 908 in FIG. 9. An advantage of this type of distributive arrangement is that the complexity of the second telephone subscriber device 602 is simpler and less expensive than the second telephone subscriber device 602 needed for the forgoing alternative.

Note that FIG. 9 represents two alternative places in a text-to-speech synthesizer 900 where the symbols are defined. However, the symbols are not limited to be defined at only these two places and may occur at other places in a text-to-speech synthesizer, as may be recognized by one skilled in the art. In general, the symbols are defined as being a representation of the text at line 707, which is no longer identified as the text at line 707, but is not yet identified as a speech waveform at line 809. The definition of the symbols as determined by a place in the text-to-speech synthesizer depends upon such design considerations as the bandwidth of the second communication channel, the complexity of the telephone network 603 and the second telephone subscriber unit 3,602, the number of symbols desired to be sent, the anticipated cost of the telephone network 603 and the second telephone subscriber unit 3,602, to name a few.

Figure 10:
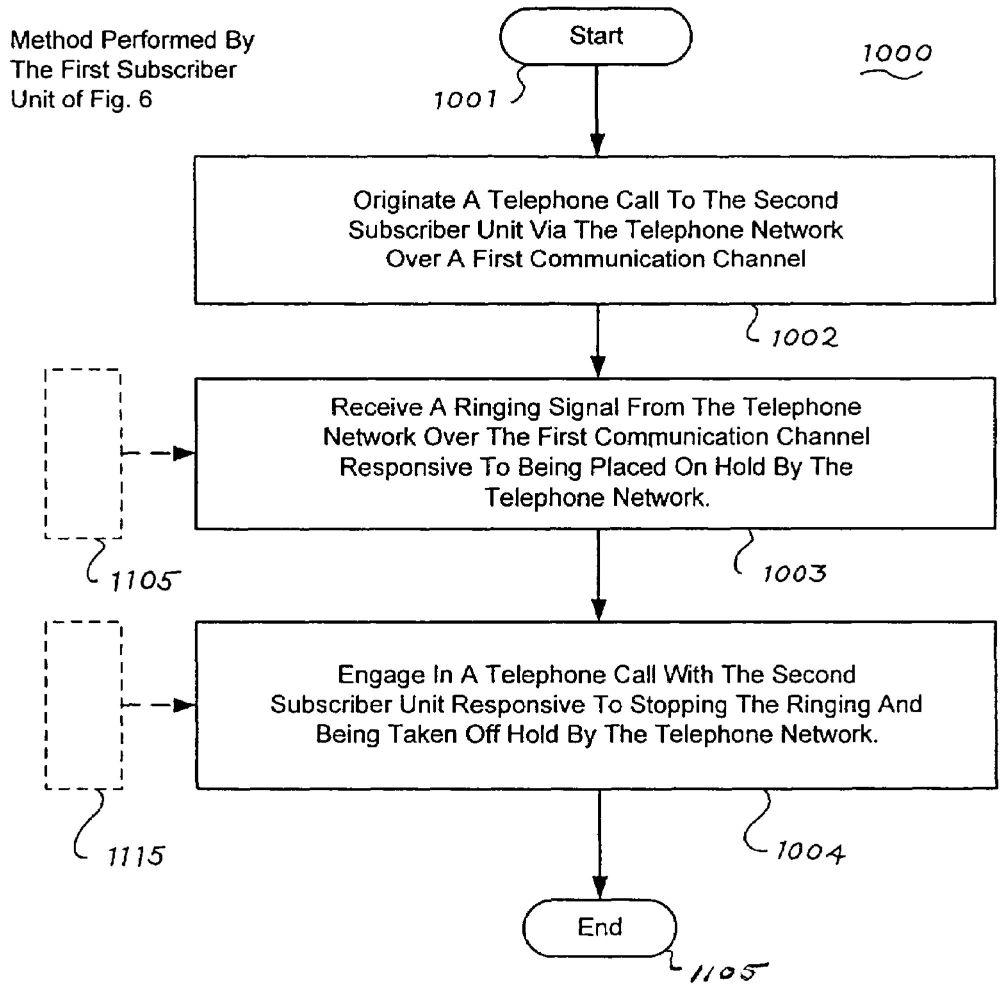
FIG. 10 illustrates a flowchart diagram describing a method performed by the first telephone subscriber unit shown in FIG. 6, in accordance with the third embodiment of the present invention.

FIG. 10 illustrates a flowchart diagram 1000 describing a method performed by the first telephone subscriber unit 601 shown in FIG. 6, in accordance with the third embodiment of the present invention.

At step 1001, the first telephone subscriber unit 601 starts the method.

At step 1002, the first telephone subscriber unit 601 originates a telephone call to the second telephone subscriber unit 602 over the first communication channel 604 between the first telephone subscriber unit 601 and the telephone network 603. Preferably, the first telephone subscriber unit 601 originates the telephone call by the first party dialing the second phone number associated with the second telephone subscriber unit 602. Other methods of origination may also be used by the first telephone subscriber unit 601.

At step 1003, the first telephone subscriber unit 601 receives a ringing signal from the telephone network 603 over the first communication channel 604 responsive to a step 1105 of being placed on hold performed by the telephone network 603. The telephone network 603 places the first telephone subscriber unit 601 on hold to permit the telephone network 603 to perform other tasks. The ringing signal provides the first telephone subscriber unit 601 with feedback to the first party that the telephone call is being attended to while the telephone network 603 is performing the other tasks during the ringing signal, as described below.

At step 1004, the first telephone subscriber unit 601 engages in the telephone call with the second telephone subscriber unit 602 responsive to a step 1115 of stopping the ringing and being taken off hold performed by the telephone network 603. The telephone network 603 stops the ringing signal to stop the feedback to the first party. The telephone network 603 takes the first telephone subscriber unit 601 off hold to permit the first party to connect with the second party.

At step 1005, the first telephone subscriber unit 601 ends the method.

Figure 11:
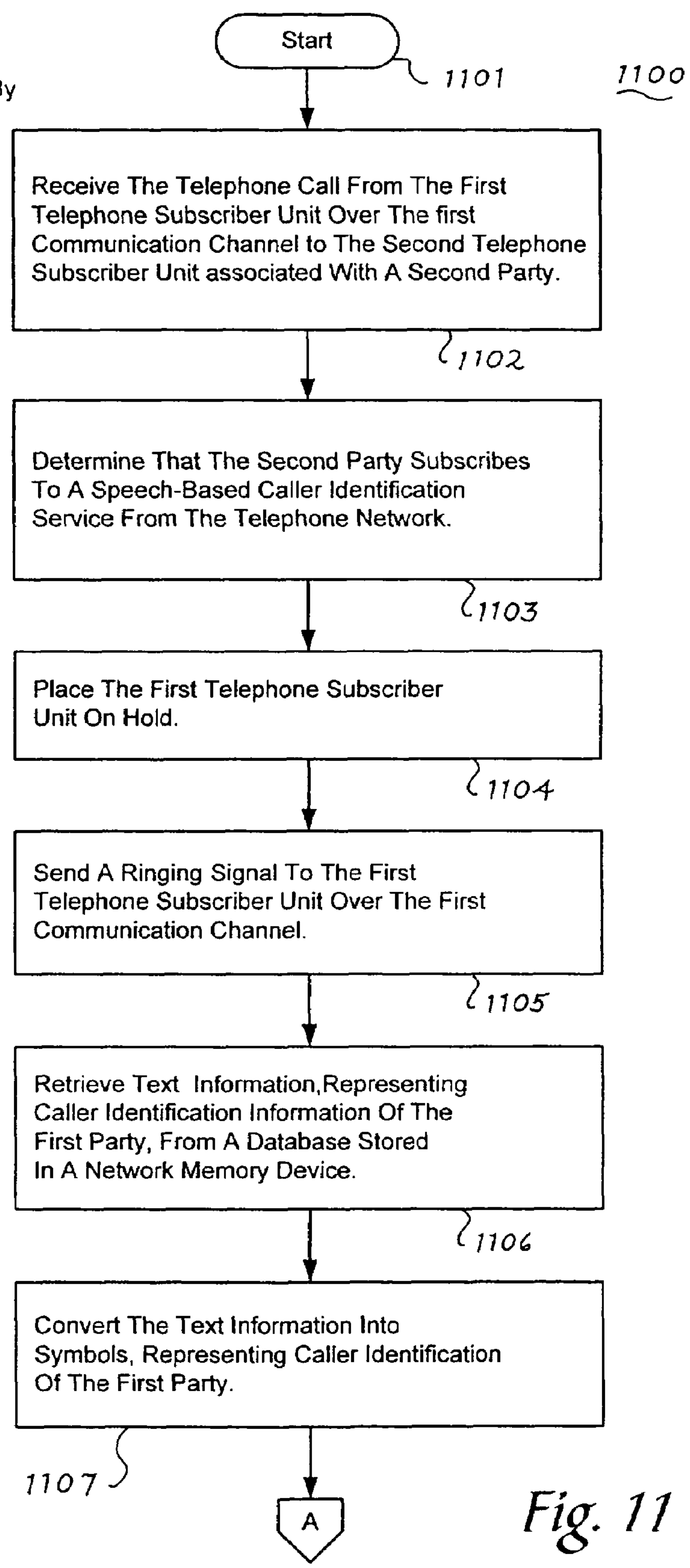
FIG. 11 illustrates a flowchart diagram describing a method performed by the network services node as part of the telephone network shown in FIG. 7, in accordance with the third embodiment of the present invention.
Figure 11:
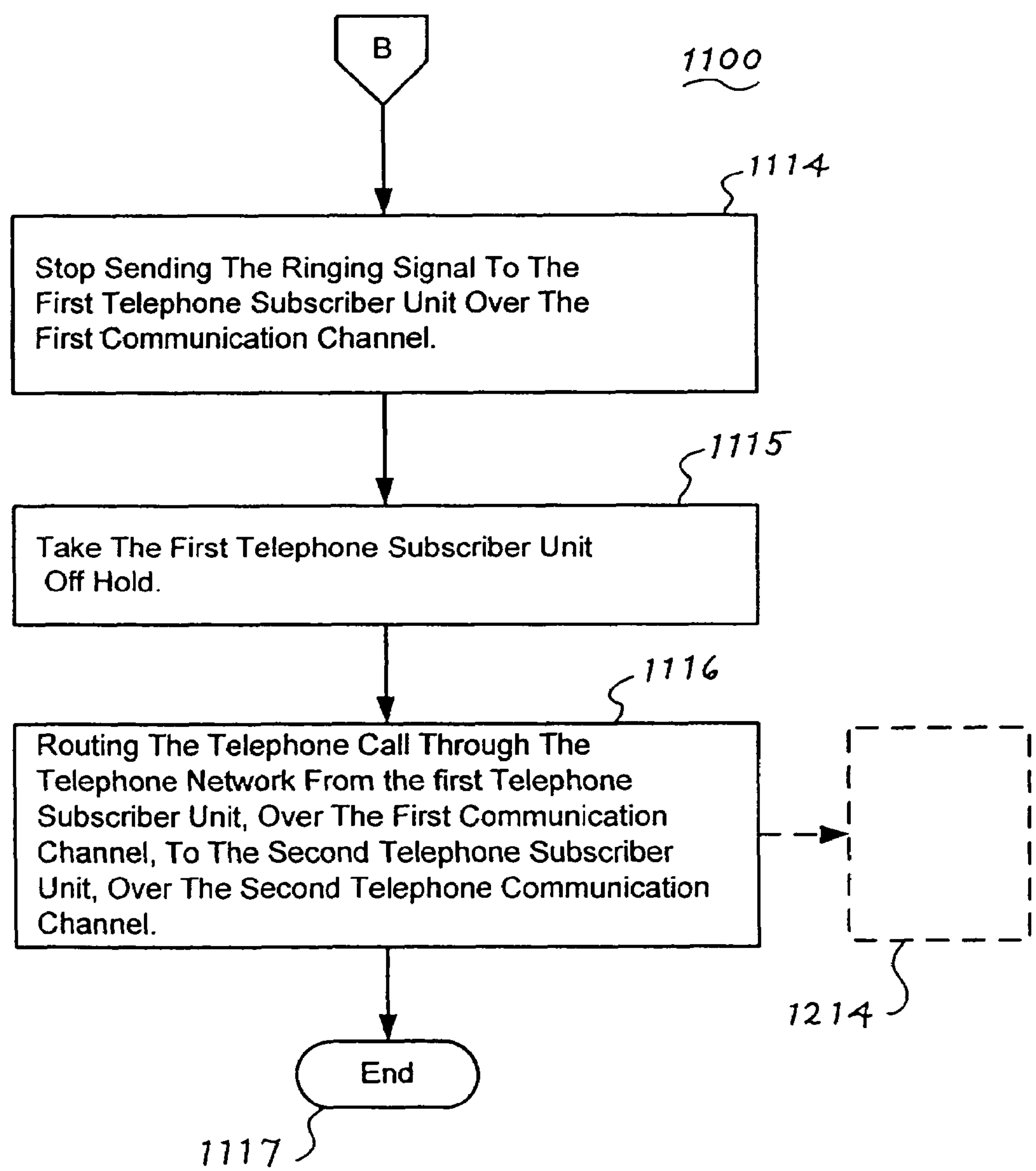

FIG. 11 illustrates a flowchart diagram 1100 describing a method performed by the network services node 609 as part of the telephone network 603 illustrated in FIG. 7, in accordance with the third embodiment of the present invention.

At step 1101, the network services node 609 starts the method.

At step 1102, the network services node 609 receives the telephone call from the first telephone subscriber unit 601 over the first communication channel 604 responsive to the step 1002 of originating the telephone call performed by the first telephone subscriber unit 601. This step 1102 of receiving is well known to those skilled in the art.

At step 1103, the network services node 609 determines that the second party subscribes to a speech-based caller identification service provided by the telephone network 603 responsive to the step 1102 of receiving the telephone call. Preferably, the SCP 608 illustrated in FIG. 6 identifies the speech-based caller identification service. Preferably, the speech-based caller identification service is a talking caller identification service. Alternatively, the speech-based caller identification service is a talking call waiting service. Other the speech-based caller identification services may also be used within the scope of the third embodiment of the present invention.

At step 1104, the network services node 609 places the first telephone subscriber unit 601 on hold responsive to the step 1103 of determining that the second party subscribes to a speech-based caller identification service. The telephone network 603 places the first telephone subscriber unit 601 on hold to permit the telephone network 603 to perform other tasks related to the speech-based caller identification service. The means and method for placing the first telephone subscriber unit 601 on hold by the telephone network 603 are well known to those skilled in the art.

At step 1105, the network services node 609 sends a ringing signal to the first telephone subscriber unit over the first communication channel responsive to the step 1104 of placing the first telephone subscriber unit 601 on hold. The ringing signal provides the first telephone subscriber unit 601 with feedback to the first party that the telephone call is being attended to while the telephone network 603 is performing tasks related to the speech-based caller identification service during the ringing signal. The means and method for sending the ringing signal to the first telephone subscriber unit 601 by the telephone network 603 are well known to those skilled in the art.

At step 1106, the network services node 609 retrieves text information, representing caller identification information of the first party, from a database stored in the memory device 703 or the memory device 607 responsive to the step 1103 of determining that the second party subscribes to a speech-based caller identification service. In the third embodiment of the present invention, the database holds phone book information or directory assistance information identifying parties registered with the telephone network. Preferably, the caller identification information of the first party is the first and last name of the first party. Other types of text information may also be stored for use with the third embodiment of the present invention. The means and method for retrieving the text information by the telephone network 603 are well known to those skilled in the art. In accordance with the first embodiment of the present invention, the retrieved text may be pre-processed as described hereinabove.

At step 1107, the network services node 609 converts the text information into symbols, representing the caller identification information of the first party, responsive to the step 1106 of retrieving the text information. Refer to FIG. 9 for a detailed description of the symbols. The text-to-symbols converter 705 illustrated in FIG. 7 performs the conversion of the text information into the symbols. The step 1107 may be performed in real time after the telephone call is received from the first telephone subscriber device 601 or performed ahead of time before the telephone call is received from the first telephone subscriber device 601.

At step 1108, the network services node 609 encodes the symbols to form a data stream at line 709 (FIG. 7) representing the caller identification information of the first party responsive to the step 1107 of converting the text information into symbols. Refer to FIG. 7 for a detailed description of the data stream. The symbol-to-data stream encoder 706 illustrated in FIG. 7 performs the encoding of the symbols to form the data stream.

At step 1109, the network services node 609 opens the second communication channel 605 between the telephone network and the second telephone subscriber unit responsive to the step 1108 of encoding the symbols. The means and method for opening the second communication channel 605 by the telephone network 603 are well known to those skilled in the art.

At step 1110, the network services node 609 sends the data stream from the telephone network 603 to the second telephone subscriber unit 602 over the second communication channel 605 responsive to the step 1109 of opening the second communication channel. The means and method for sending the data stream from the telephone network 603 to the second telephone subscriber unit 602 by the telephone network 603 are well known to those skilled in the art.

At step 1111, the network services node 609 determines that the transmission of the data stream from the telephone network 603 to the second telephone subscriber unit 602 over the second communication channel 605 is successful responsive the step 1110 of sending the data stream and responsive to receiving a response 1205 from the second telephone subscriber unit 602. The means and method for determining that the transmission of the data stream is successful by the telephone network 603 is well known to those skilled in the art. One such method may be a checksum method, as is well known to those skilled in the art. The response from the second telephone subscriber unit 602 provides feedback from the second telephone subscriber unit 602 to the telephone network 603 that the data stream is successfully received.

At step 1112, the network services node 609 sends a ringing signal to the second telephone subscriber unit 602 over the second communication channel 605 responsive to the step 1111 of determining that the transmission of the data stream over the second communication channel 605 is successful. The ringing signal alerts the second party, at step 1209 in FIG. 12, that an incoming call is available to be answered by the second party. Preferably, only one ringing signal is sent.

Figure 12:
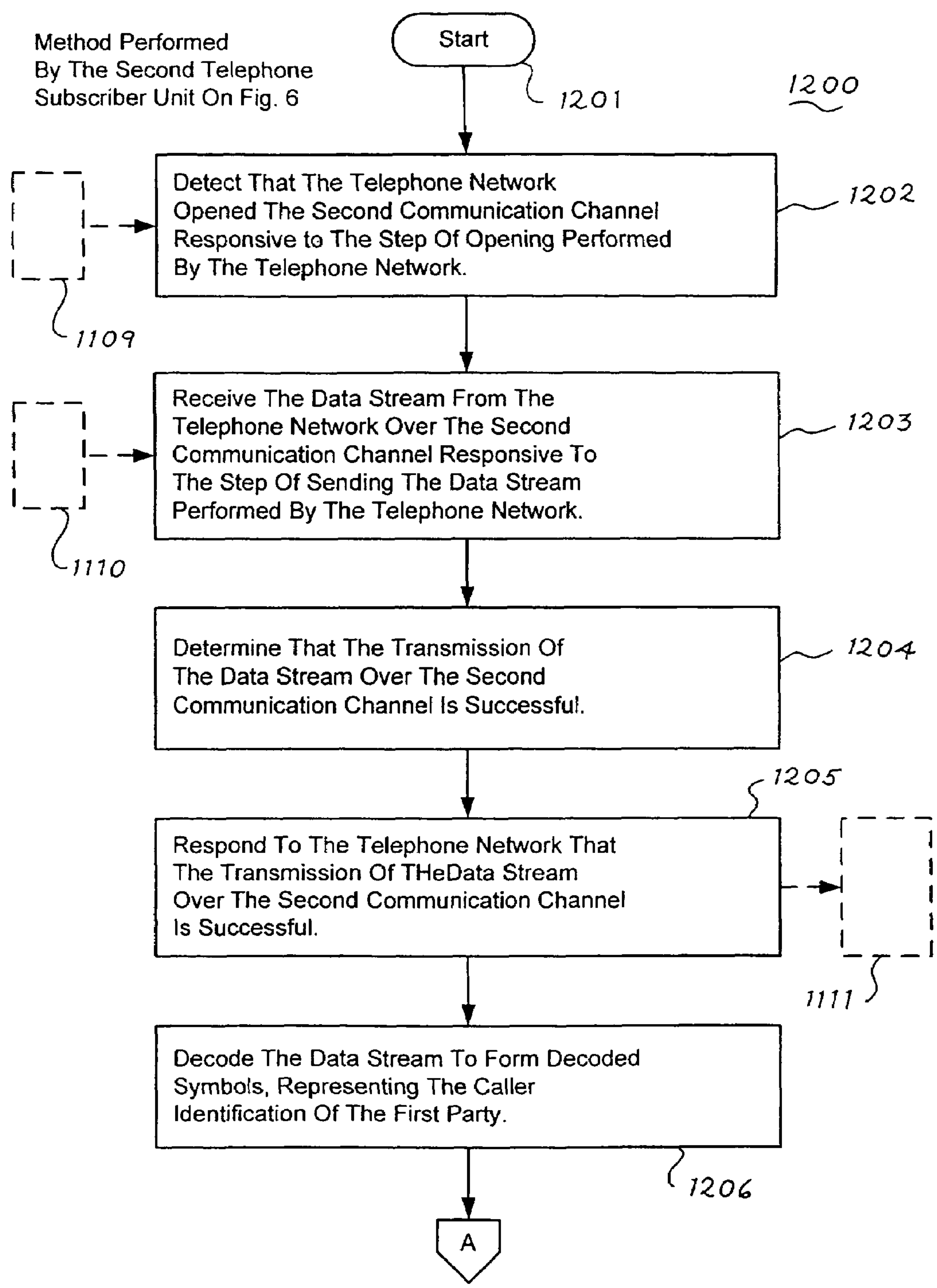
FIG. 12 illustrates a flowchart diagram describing a method performed by the second telephone subscriber unit shown in FIG. 8, in accordance with the third embodiment of the present invention.
Figure 12:
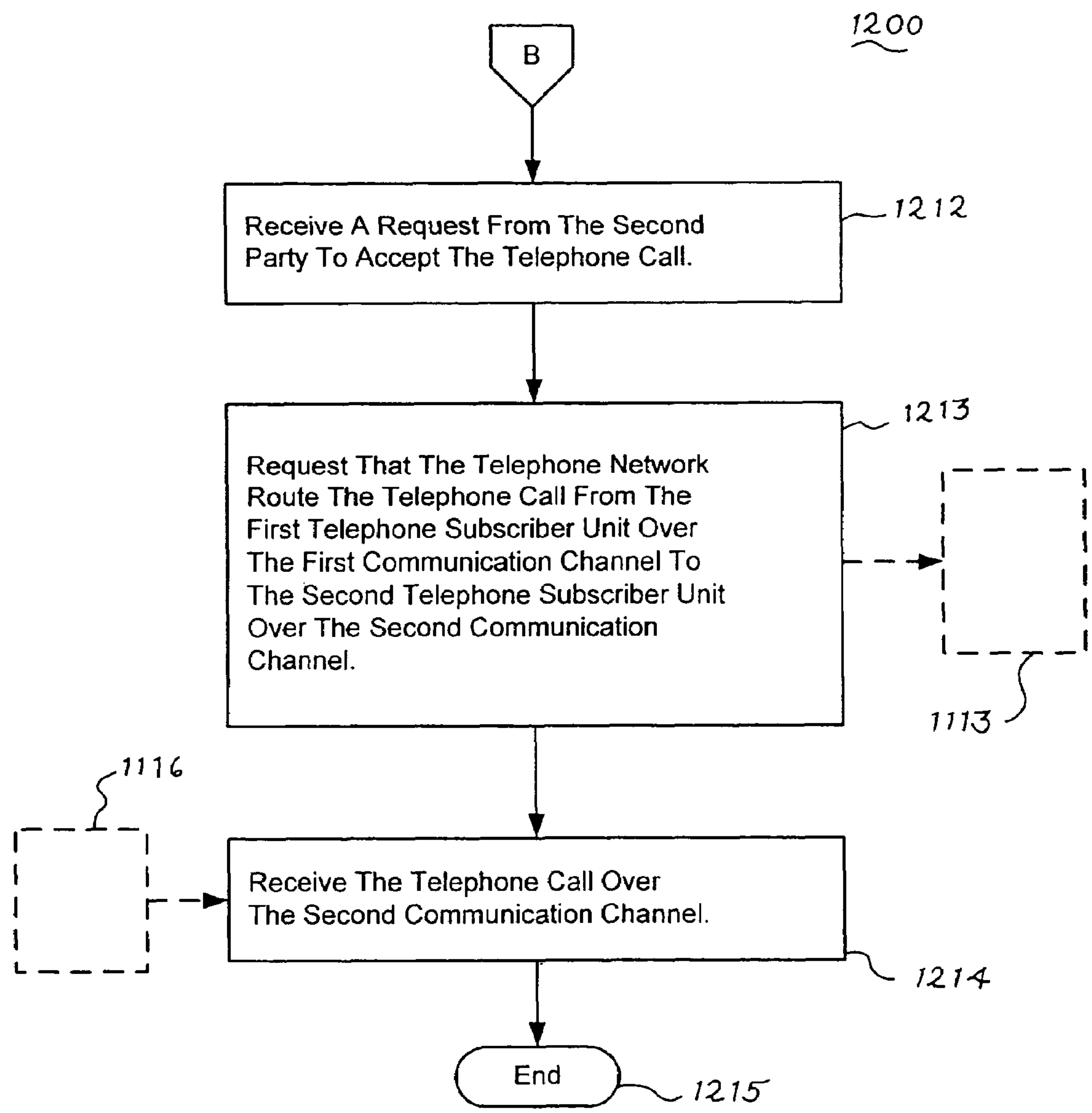

At step 1113, the network services node 609 receives a request, from step 1213 in FIG. 12, from the second telephone subscriber unit 602 over the second communication channel 605 that the telephone network 603 route the telephone call to the second telephone subscriber unit 602 over the second communication channel 605 responsive to the step 1112 of sending the ringing signal to the second telephone subscriber unit 602 over the second communication channel 605. The request from the second telephone subscriber unit 602 indicates acceptance of the telephone call by the second party.

At step 1114, the network services node 609 stops the sending of the ringing signal to the first telephone subscriber unit 601 over the first communication channel 604 responsive to the step 1113 of receiving the request. The network services node 609 stops the ringing signal to stop giving the first telephone subscriber unit 601 feedback now that the network services node 609 completed the tasks and that the second telephone subscriber unit 602 sent the response.

At step 1115, the network services node 609 takes the first telephone subscriber unit 601 off hold responsive to the step 1114 of stopping the sending. The network services node 609 takes the first telephone subscriber unit 601 off hold to prepare the first telephone subscriber unit 601 to connect with the second telephone subscriber unit 602.

At step 1116, the network services node 609 routes the telephone call through the telephone network 603 from the first telephone subscriber unit 601 over the first communication channel 604 to the second telephone subscriber unit 602 over the second communication channel 605 responsive to the step 1115 of taking the first telephone subscriber unit 601 off hold. The means and method for routing the telephone call through the telephone network 603 are well known to those skilled in the art. The second telephone subscriber unit 602 receives the telephone call at step 1214 in FIG. 12.

At step 1117, the network services node 609 ends the method.

FIG. 12 illustrates a flowchart diagram 1200 describing a method performed by the second telephone subscriber unit 602 shown in FIG. 8 in accordance with the third embodiment of the present invention.

At step 1201, the second telephone subscriber unit 602 starts the method.

At step 1202, the second telephone subscriber unit 602 detects that the telephone network 603 opened the second communication channel 605 responsive to the step 1109 of opening performed by the telephone network 603. The means and method of the second telephone subscriber unit 602 detecting that the telephone network 603 opened the second communication channel 605 are well known to those skilled in the art.

At step 1203, the second telephone subscriber unit 602 receives the data stream from the telephone network 603 over the second communication channel 605 responsive to the step 1110 of sending the data stream performed by the telephone network 603. The means and method of the second telephone subscriber unit 602 receives the data stream are well known to those skilled in the art.

At step 1204, the second telephone subscriber unit 602 determines that the transmission of the data stream over the second communication channel 605 is successful responsive to the step 1203 of receiving the data stream. The means and method of the second telephone subscriber unit 602 determines that the transmission of the data stream is successful are well known to those skilled in the art.

At step 1205, the second telephone subscriber unit 602 responds to the telephone network 603 that the transmission of the data stream over the second communication channel 605 is successful responsive to the step 1204 of determining that the transmission of the data stream over the second communication channel 605 is successful. The telephone network 603 receives the response at step 1111. The means and method of the second telephone subscriber unit 602 responding to the telephone network 603 are well known to those skilled in the art.

At step 1206, the second telephone subscriber unit 602 decodes the data stream to form decoded symbols, representing the caller identification information of the first party, responsive 1203 to the step of receiving the data stream. The data stream-to-symbols decoder 805 in FIG. 8 decodes the data stream to form the decoded symbols at line 808. Refer to FIG. 8 for a detailed description of the decoded symbols.

At step 1207, the second telephone subscriber unit 602 converts the decoded symbols to speech, representing the caller identification information of the first party, responsive to the step 1206 of decoding. The decoded symbols-to-speech-converter 806 in FIG. 8 converts the decoded symbols to a speech waveform at line 809. Refer to FIGS. 8 and 9 for a detailed description of the decoded symbols-to-speech-converter 806.

At step 1208, the second telephone subscriber unit 602 stores the speech in the memory device 802 responsive to the step 1207 of converting the decoded symbols. Refer to FIG. 8 for a detailed description of the memory device 802.

At step 1209, the second telephone subscriber unit 602 receives the ringing signal from the telephone network 603 over the second communication channel 605 responsive to the step 1205 of responding. The telephone network 603 generates the ringing signal at step 1112 in FIG. 11. Preferably, only one ringing signal is received.

At step 1210, the second telephone subscriber unit 602 generates the ringing signal responsive to the step 1209 of receiving the ringing signal to alert the second party to an availability of the telephone call from the first telephone subscriber unit. Preferably, only one ringing signal is generated.

At step 1211, the second telephone subscriber unit 602 generates the speech responsive to the step of converting the decoded symbols at line 808 (FIG. 8) to the speech waveform at line 809 and responsive to the step 1210 of generating the ringing signal to permit the second party associated with the second telephone subscriber unit 602 to listen to the speech to identify an identity of the first party associated with the first telephone subscriber unit 601 prior to accepting the telephone call. This step best illustrates a result of the speech-based calling identification service subscribed to by the second party. Such services may be used for talking caller identification and/or talking call waiting, for example. Preferably, the speech is generated by an acoustic transducer, such as a loudspeaker 811 or an earpiece speaker 810, that converts the speech waveform, as an electrical signal, into audible sound, as an acoustic signal.

Note that the ringing signal and the audible speech generation may be provided in any pattern or frequency. Preferably, the ringing signal rings once followed by the audible speech generation of the first party's synthesized first and/or last name. Alternatively, any number of rings or audible announcements and in any order may be used. Further, the third embodiment of the present invention may be combined with a text-based display of the caller identification information.

At step 1212, the second telephone subscriber unit 602 receives a request from the second party to accept the telephone call responsive to the step 1211 of generating the speech. Preferably, the request is taking the second telephone subscriber unit 602 off hook, such as by picking up a handset of a wireline phone or by pressing a button on a cellular or cordless phone. Alternatively, other methods the second party generating the request may also be used such as, voice recognition and a signal from an answering machine, for example.

At step 1213, the second telephone subscriber unit 602 requests that the telephone network 603 route the telephone call from the first telephone subscriber unit 601 over the first communication channel 604 to the second telephone subscriber unit 602 over the second communication channel 605 responsive to the step 1212 of receiving the request from the second party to accept the telephone call. The telephone network 603 receives the request at step 1113 in FIG. 11. The means and method of the second telephone subscriber unit 602 requesting that the telephone network 603 route the telephone call are well known to those skilled in the art.

At step 1214, the second telephone subscriber unit 602 receives the telephone call over the second communication channel 605 responsive to the step of requesting and responsive to the step 1116 of routing performed by the telephone network 603 in FIG. 11. The means and method of the second telephone subscriber unit 602 receiving the telephone call are well known to those skilled in the art.

At step 1215, the second telephone subscriber unit 602 ends the method.

The block diagrams and the flowchart diagrams illustrated in FIGS. 6 through 12 are representative of the third embodiment of the present invention. Note that all of the steps or blocks in the figures are not necessary to perform the distributed text-to-speech synthesis. For example, step 1111 in FIG. 11 may be eliminated when designers anticipate that the data stream transmission is of high enough quality that a check is not needed. Further, some of the steps do not need to be in the illustrated in a particular order or performed in a particular way. For example, the block diagrams and the steps related to managing the first telephone subscriber unit 601, the second telephone subscriber unit 602 and the telephone network 603 may be different depending on various design trade offs, system requirements, customer requirements, and the like.

While the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

It is therefore intended that the foregoing detailed description be regarded as illustrative rather than limiting, and that it be understood that it is the following claims, including all equivalents, that are intended to define the spirit and scope of this invention.

The invention claimed is:

1. A method for performing distributed text-to-speech synthesis by a second telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, the method comprising the steps of:

detecting that the telephone network opened a second communication channel between the telephone network and the second telephone subscriber unit responsive to a step of opening a first communication channel between a first telephone subscriber unit and the telephone network as performed by the telephone network;

receiving a data stream, representing caller identification information of the first party, from the telephone network over the second communication channel responsive to a step of sending the data stream to the second telephone subscriber unit over the second communication channel as performed by the telephone network;

decoding the data stream to form decoded symbols, representing the caller identification information of the first party, responsive to the step of receiving the data stream, wherein the decoded symbols represented text of the caller identification information;

converting the decoded symbols to speech, representing the caller identification information of the first party, responsive to the step of decoding; and generating the speech responsive to the step of converting the decoded symbols to speech to permit the second party associated with the second telephone subscriber unit to listen to the speech to identify an identity of first party associated with the first telephone subscriber unit prior to accepting a telephone call from the first telephone subscriber unit;

wherein the decoded symbols are represented by spectral and prosodic feature parameters.

2. A method according to claim 1 further comprising the steps of: determining that the transmission of the data stream over the second communication channel is successful responsive to the step of receiving the data stream; and responding to the telephone network that the transmission of the data stream over the second communication channel is successful responsive to the step of determining that the transmission of the data stream over the second communication channel is successful, wherein the step of decoding the data stream is responsive to the step of responding.

3. A method according to claim 1 further comprising the step of: storing the speech in a subscriber unit memory device responsive to the step of converting the decoded symbols.

4. A method according to claim 1 further comprising the steps of: receiving a ringing signal from the telephone network over the second communication channel responsive to the step of receiving the data stream; and generating the ringing signal responsive to the step of receiving the ringing signal to alert the second party to an availability of the telephone call originated by the first telephone subscriber unit to the second telephone subscriber unit through the telephone network.

5. A method according to claim 1 further comprising the steps of: receiving a request from the second party to accept the telephone call over the second communication channel responsive to the step of generating the speech; requesting that the telephone network route the telephone call to the second telephone subscriber unit over the second communication channel responsive to the step of receiving the request from the second party to accept the telephone call over the second communication channel; and receiving the telephone call over the second communication channel responsive to the step of requesting and responsive to the telephone network routing the telephone call to the second telephone subscriber unit over the second communication channel.

6. A method according to claim 1 wherein the decoded symbols are represented by phonemic and prosodic information.

7. A method for performing distributed text-to-speech synthesis by a second telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, the method comprising the steps of:

detecting that the telephone network opened a second communication channel between the telephone network and the second telephone subscriber unit responsive to a step of opening a first communication channel between a first telephone subscriber unit and the telephone network as performed by the telephone network;

receiving a data stream, representing caller identification information of the first party, from the telephone network over the second communication channel responsive to a step of sending the data stream to the second telephone subscriber unit over the second communication channel as performed by the telephone network;

decoding the data stream to form decoded symbols, representing the caller identification information of the first party, responsive to the step of receiving the data stream;

converting the decoded symbols to speech, representing the caller identification information of the first party, responsive to the step of decoding;

receiving a ringing signal from the telephone network over the second communication channel responsive to the step of receiving the data stream;

generating the ringing signal responsive to the step of receiving the ringing signal to alert the second party to an availability of a telephone call originated by the first telephone subscriber unit to the second telephone subscriber unit through the telephone network;

generating the speech responsive to the step of converting the decoded symbols to speech and responsive to the step of generating the ringing signal to permit the second party associated with the second telephone subscriber unit to listen to the speech to identify an identity of first party associated with the first telephone subscriber unit prior to accepting the telephone call;

receiving a request from the second party to accept the telephone call over the second communication channel responsive to the step of generating the speech;

requesting that the telephone network route the telephone call to the second telephone subscriber unit over the second communication channel responsive to the step of receiving the request from the second party to accept the telephone call over the second communication channel;

receiving the telephone call over the second communication channel responsive to the step of requesting and responsive to the telephone network routing the telephone call to the second telephone subscriber unit over the second communication channel;

determining that the transmission of the data stream over the second communication channel is successful responsive to the step of receiving the data stream; and responding to the telephone network that the transmission of the data stream over the second communication channel is successful responsive to the step of determining that the transmission of the data stream over the second communication channel is successful;

wherein the step of decoding the data stream is responsive to the step of responding; and wherein the decoded symbols are represented by spectral and prosodic feature parameters.

8. A method according to claim 7 further comprising the step of: storing the speech in a subscriber unit memory device responsive to the step of converting the decoded symbols.

9. A method according to claim 7 wherein the decoded symbols are represented by phonemic and prosodic information.

10. A method for performing distributed text-to-speech synthesis by a second telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, the method comprising the steps of:

detecting that the telephone network opened a second communication channel between the telephone network and the second telephone subscriber unit responsive to a step of opening a first communication channel between a first telephone subscriber unit and the telephone network as performed by the telephone network;

receiving a data stream, representing caller identification information of the first party, from the telephone network over the second communication channel responsive to a step of sending the data stream to the second telephone subscriber unit over the second communication channel as performed by the telephone network;

decoding the data stream to form decoded symbols, representing the caller identification information of the first party, responsive to the step of receiving the data stream;

determining that the transmission of the data stream over the second communication channel is successful responsive to the step of receiving the data stream; and responding to the telephone network that the transmission of the data stream over the second communication channel is successful responsive to the step of determining that the transmission of the data stream over the second communication channel is successful;

converting the decoded symbols to speech, representing the caller identification information of the first party, responsive to the step of decoding;

storing the speech in a subscriber unit memory device responsive to the step of converting the decoded symbols;

receiving a ringing signal from the telephone network over the second communication channel responsive to the step of responding;

generating the ringing signal responsive to the step of receiving the ringing signal to alert the second party to an availability of a telephone call originated by the first telephone subscriber unit to the second telephone subscriber unit through the telephone network;

generating the speech responsive to the step of converting the decoded symbols to speech and responsive to the step of generating the ringing signal to permit the second party associated with the second telephone subscriber unit to listen to the speech to identify an identity of first party associated with the first telephone subscriber unit prior to accepting the telephone call;

receiving a request from the second party to accept the telephone call over the second communication channel responsive to the step of generating the speech;

requesting that the telephone network route the telephone call to the second telephone subscriber unit over the second communication channel responsive to the step of receiving the request from the second party to accept the telephone call over the second communication channel; and receiving the telephone call over the second communication channel responsive to the step of requesting and responsive to the telephone network routing the telephone call to the second telephone subscriber unit over the second communication channel;

wherein the decoded symbols are represented by spectral and prosodic feature parameters.

11. A method according to claim 10 wherein the decoded symbols are represented by phonemic and prosodic information.

12. A method for performing distributed text-to-speech synthesis in a telecommunications system including a first telephone subscriber unit, a second telephone subscriber unit, and a telephone network, the method comprising the steps of:

performing, by the first telephone subscriber unit having a first telephone number and associated with a first party by the telephone network, the steps of:

originating a telephone call to the second telephone subscriber unit, having a second telephone number and associated with a second party by the telephone network, over a first communication channel between the first telephone subscriber unit and the telephone network;

receiving a ringing signal from the telephone network over the first communication channel responsive to a step of being placed on hold performed by the telephone network;

engaging in the telephone call with the second telephone subscriber unit responsive to a step of being taken off hold performed by the telephone network;

performing, by the telephone network coupled to the first telephone unit and the second telephone unit, the steps of:

receiving the telephone call from the first telephone subscriber unit over the first communication channel responsive to the step of originating the telephone call;

determining that the second party subscribes to a speech-based caller identification service provided by the telephone network responsive to the step of receiving the telephone call;

placing the first telephone subscriber unit on hold responsive to the step of determining;

sending a ringing signal to the first telephone subscriber unit over the first communication channel responsive to the step of placing;

retrieving text information, representing caller identification information of the first party, from a database stored in a network memory device responsive to the step of determining;

converting the text information into symbols, representing the caller identification information of the first party, responsive to the step of retrieving;

encoding the symbols to form a data stream representing the caller identification information of the first party;

opening a second communication channel between the telephone network and the second telephone subscriber unit responsive to the step of encoding; sending the data stream from the telephone network to the second telephone subscriber unit over the second communication channel responsive to the step of opening;

determining that the transmission of the data stream from the telephone network to the second telephone subscriber unit over the second communication channel is successful responsive the step of sending the data stream and responsive to a response from the second telephone subscriber unit;

sending a ringing signal to the second telephone subscriber unit over the second communication channel responsive to the step of determining that the transmission of the data stream over the second communication channel is successful;

receiving a request from the second telephone subscriber unit over the second communication channel that the telephone network route the telephone call to the second telephone subscriber unit over the second communication channel responsive to the step of sending a ringing signal to the second telephone subscriber unit over the second communication channel;

stopping the sending of the ringing signal to the first telephone subscriber unit over the first communication channel responsive to the step of receiving the request;

taking the first telephone subscriber unit off hold responsive to the step of stopping; and routing the telephone call through the telephone network from the first telephone subscriber unit over the first communication channel to the second telephone subscriber unit over the second communication channel responsive to the step of taking the first telephone subscriber unit off hold; and performing by the second telephone subscriber unit the steps of:

detecting that the telephone network opened the second communication channel responsive to the step of opening;

receiving the data stream from the telephone network over the second communication channel responsive to the step of sending the data stream; determining that the transmission of the data stream over the second communication channel is successful responsive to the step of receiving the data stream;

responding to the telephone network that the transmission of the data stream over the second communication channel is successful responsive to the step of determining that the transmission of the data stream over the second communication channel is successful;

decoding the data stream to form decoded symbols, representing the caller identification information of the first party, responsive to the step of receiving the data stream;

converting the decoded symbols to speech, representing the caller identification information of the first party, responsive to the step of decoding;

storing the speech in a subscriber unit memory device responsive to the step of converting the decoded symbols;

receiving the ringing signal from the telephone network over the second communication channel responsive to the step of responding;

generating the ringing signal responsive to the step of receiving the ringing signal to alert the second party to an availability of the telephone call from the first telephone subscriber unit;

generating the speech responsive to the step of converting the decoded symbols to speech and responsive to the step of generating the ringing signal to permit the second party associated with the second telephone subscriber unit to listen to the speech to identify an identity of first party associated with the first telephone subscriber unit prior to accepting the telephone call;

receiving a request from the second party to accept the telephone call responsive to the step of generating the speech;

requesting that the telephone network route the telephone call from the first telephone subscriber unit over the first communication channel to the second telephone subscriber unit over the second communication channel responsive to the step of receiving the request from the second party to accept the telephone call; and receiving the telephone call over the second communication channel responsive to the step of requesting and responsive to the step of routing.

13. A method according to claim 12 further comprising the step of: converting, by the telephone network, the text information from a first data format to a second data format suitable for text-to-speech synthesis prior to the step of converting the text information into symbols.

14. A method according to claim 12 wherein the decoded symbols are represented by phonemic and prosodic information.

15. A method according to claim 12 wherein the decoded symbols are represented by spectral and prosodic feature parameters.

16. A second telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, the second telephone subscriber unit comprising:

a central telephone interface module for performing steps of:

detecting that the telephone network opened a second communication channel between the telephone network and the second telephone subscriber unit responsive to a step of opening a first communication channel between a first telephone subscriber unit and the telephone network as performed by the telephone network; and receiving a data stream, representing caller identification information of the first party, from the telephone network over the second communication channel responsive to a step of sending the data stream to the second telephone subscriber unit over the second communication channel as performed by the telephone network;

a processor for performing steps of:

decoding the data stream to form decoded symbols, representing the caller identification information of the first party, responsive to the step of receiving the data stream; and converting the decoded symbols to speech, representing the caller identification information of the first party, responsive to the step of decoding; and an electroacoustic transducer for performing a step of generating the speech responsive to the step of converting the decoded symbols to speech to permit the second party associated with the second telephone subscriber unit to listen to the speech to identify an identity of first party associated with the first telephone subscriber unit prior to accepting a telephone call from the first telephone subscriber unit;

determining that a transmission of the data stream over the second communication channel is successful responsive to the step of receiving the data stream; and responding to the telephone network that the transmission of the data stream over the second communication channel is successful responsive to the step of determining that the transmission of the data stream over the second communication channel is successful, wherein the step of decoding the data stream is responsive to the step of responding;

wherein the decoded symbols are represented by spectral and prosodic feature parameters.

17. A second telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, the second telephone subscriber unit comprising:

means for performing a step of detecting that the telephone network opened a second communication channel between the telephone network and the second telephone subscriber unit responsive to a step of opening a first communication channel between a first telephone subscriber unit and the telephone network as performed by the telephone network;

means for performing a step of receiving a data stream, representing caller identification information of the first party, from the telephone network over the second communication channel responsive to a step of sending the data stream to the second telephone subscriber unit over the second communication channel as performed by the telephone network;

means for performing a step of decoding the data stream to form decoded symbols, representing the caller identification information of the first party, responsive to the step of receiving the data stream; and means for performing a step of converting the decoded symbols to speech, representing the caller identification information of the first party, responsive to the step of decoding; and means for performing a step of generating the speech responsive to the step of converting the decoded symbols to speech to permit the second party associated with the second telephone subscriber unit to listen to the speech to identify an identity of first party associated with the first telephone subscriber unit prior to accepting a telephone call from the first telephone subscriber unit;

wherein the subscriber unit is operative to perform a step of determining that a transmission of the data stream over the second communication channel is successful responsive to the step of receiving the data stream;

wherein the subscriber unit is operative to perform a step responding to the telephone network that the transmission of the data stream over the second communication channel is successful responsive to the step of determining that the transmission of the data stream over the second communication channel is successful;

wherein the step of decoding the data stream is responsive to the step of responding; and wherein the decoded symbols are represented by spectral and prosodic feature parameters.

18. In a second telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, an article in the second telephone subscriber unit comprising:

a computer-readable data storage medium;

means recorded on the computer-readable data storage medium for performing a step of detecting that the telephone network opened a second communication channel between the telephone network and the second telephone subscriber unit responsive to a step of opening a first communication channel between a first telephone subscriber unit and the telephone network as performed by the telephone network;

means recorded on the computer-readable data storage medium for performing a step of receiving a data stream, representing caller identification information of the first party, from the telephone network over the second communication channel responsive to a step of sending the data stream to the second telephone subscriber unit over the second communication channel as performed by the telephone network;

means recorded on the computer-readable data storage medium for performing a step of decoding the data stream to form decoded symbols, representing the caller identification information of the first party, responsive to the step of receiving the data stream; and means recorded on the computer-readable data storage medium for performing a step of converting the decoded symbols to speech, representing the caller identification information of the first party, responsive to the step of decoding; and means recorded on the computer-readable data storage medium for providing the speech to an electroacoustic transducer that performs a step of generating the speech responsive to the step of converting the decoded symbols to speech to permit the second party associated with the second telephone subscriber unit to listen to the speech to identify an identity of first party associated with the first telephone subscriber unit prior to accepting a telephone call from the first telephone subscriber unit;

wherein the subscriber unit is operative to perform a step of determining that a transmission of the data stream over the second communication channel is successful responsive to the step of receiving the data stream;

wherein the subscriber unit is operative to perform a step responding to the telephone network that the transmission of the data stream over the second communication channel is successful responsive to the step of determining that the transmission of the data stream over the second communication channel is successful;

wherein the step of decoding the data stream is responsive to the step of responding; and wherein the decoded symbols are represented by spectral and prosodic feature parameters.

19. A second telephone subscriber unit forming a cordless telephone subscriber unit, a telephone network being coupled to a first telephone subscriber unit and the second telephone subscriber unit, the first telephone subscriber unit having a first telephone number and associated with a first party by the telephone network, and the second telephone subscriber unit having a second telephone number and associated with a second party by the telephone network, the second telephone subscriber unit comprising:

a cordless handset;

a cordless base station unit adapted to communicate radio frequency signals with the cordless handset and including:

a central telephone interface module for performing steps of:

detecting that the telephone network opened a second communication channel between the telephone network and the second telephone subscriber unit responsive to a step, performed by the first telephone subscriber unit, of initiating a telephone call to the second telephone subscriber unit through the telephone network thereby causing the telephone network to open a first communication channel between a first telephone subscriber unit and the telephone network; and receiving a data stream, representing caller identification information of the first party, from the telephone network over the second communication channel responsive to a step, performed by the telephone network, of sending the data stream to the second telephone subscriber unit over the second communication channel;

a processor, electrically coupled to the central telephone interface module and provided with one of the cordless handset and the cordless base station unit, for performing steps of:

decoding the data stream to form decoded symbols, representing the caller identification information of the first party, responsive to the step of receiving the data stream; and converting the decoded symbols to a speech signal, representing the caller identification information of the first party, responsive to the step of decoding; and an electroacoustic transducer, provided with at least one of the cordless handset and the cordless base station unit, for performing a step of converting the speech signal into acoustic speech responsive to the step of converting to permit the second party associated with the second telephone subscriber unit to listen to the acoustic speech to identify an identity of first party associated with the first telephone subscriber unit in real time prior to accepting the telephone call from the first telephone subscriber unit;

wherein the processor performs steps of:

determining a proximity of the cordless handset to the cordless base station unit;

causing a loudspeaker provided with the cordless base station unit to generate an acoustic signal responsive to a determination that the cordless handset is proximate to the cordless base station unit;

preventing one of the loudspeaker and an earpiece speaker of the cordless handset from generating the acoustic signal responsive to the determination that the cordless handset is proximate to the cordless base station unit; and causing one of the loudspeaker and the earpiece speaker of the cordless handset to generate the acoustic signal responsive to a determination that the cordless handset is not proximate to the cordless base station unit.

20. A second telephone subscriber unit according to claim 19 wherein the electroacoustic transducer further comprises at least one of: a loudspeaker provided with the cordless base station unit; a loudspeaker provided with the cordless handset; and an earpiece speaker provided with the cordless handset.

21. A second telephone subscriber unit according to claim 19 wherein the processor determines the proximity of the cordless handset to the cordless base station unit is determined by at least one of: mechanical interaction between the cordless handset and the cordless base station unit; and electrical signal transmission between the cordless handset and the cordless base station unit.

22. A second telephone subscriber unit according to claim 19 wherein the proximity of the cordless handset to the cordless base station unit is one of a fixed distance and a variable distance, wherein the fixed distance is set by a manufacturer of the second telephone subscriber unit, and wherein the variable distance is set by a user of the second telephone subscriber unit.

23. A second telephone subscriber unit according to claim 20 wherein the processor performs a step of determining that the cordless handset is either turned off or has a low battery power thereby lacking enough electrical energy for the loudspeaker or the earpiece speaker of the cordless handset to generate the acoustic signal, and performs a step of causing the loudspeaker provided with the cordless base station unit to generate the acoustic signal responsive to the step of determining.

* * * * *